United States Patent
Kobayashi et al.

(10) Patent No.: US 11,655,875 B2
(45) Date of Patent: May 23, 2023

(54) DAMPING VALVE AND SHOCK ABSORBER

(71) Applicant: KYB Corporation, Tokyo (JP)

(72) Inventors: Yoshifumi Kobayashi, Aichi (JP); Tomoyasu Abe, Aichi (JP); Yuusuke Furuta, Gifu (JP)

(73) Assignee: KYB CORPORATION, Tokyo (JP)

(*) Notice: Subject to any disclaimer, the term of this patent is extended or adjusted under 35 U.S.C. 154(b) by 511 days.

(21) Appl. No.: 16/968,074

(22) PCT Filed: Feb. 12, 2019

(86) PCT No.: PCT/JP2019/004842
§ 371 (c)(1),
(2) Date: Aug. 6, 2020

(87) PCT Pub. No.: WO2019/163579
PCT Pub. Date: Aug. 29, 2019

(65) Prior Publication Data
US 2021/0025471 A1 Jan. 28, 2021

(30) Foreign Application Priority Data
Feb. 21, 2018 (JP) .............................. JP2018-028777

(51) Int. Cl.
*F16F 9/34* (2006.01)
*F16F 9/18* (2006.01)
(Continued)

(52) U.S. Cl.
CPC .............. *F16F 9/348* (2013.01); *F16F 9/185* (2013.01); *F16F 9/3488* (2013.01); *F16F 9/516* (2013.01);
(Continued)

(58) Field of Classification Search
CPC .......... F16F 9/348; F16F 9/185; F16F 9/3488; F16F 9/516; F16F 9/187; F16F 2222/12;
(Continued)

(56) References Cited

U.S. PATENT DOCUMENTS

| | | | |
|---|---|---|---|
| 9,212,719 B2* | 12/2015 | Kim ...................... | F16F 9/5126 |
| 9,777,790 B2* | 10/2017 | Mizuno ................ | F16F 9/3485 |
| 2009/0107782 A1* | 4/2009 | Ota ....................... | F16F 9/3485 |
| | | | 188/282.5 |

(Continued)

FOREIGN PATENT DOCUMENTS

| | | |
|---|---|---|
| CN | 106133382 A | 11/2016 |
| JP | S62149644 U | 9/1987 |

(Continued)

*Primary Examiner* — Thomas J Williams
*Assistant Examiner* — James K Hsiao
(74) *Attorney, Agent, or Firm* — Rabin & Berdo, P.C.

(57) ABSTRACT

A damping valve includes a valve seat member, a first valve element stacked on the valve seat member, a second valve element provided between an inner circumference valve seat of the valve seat member and the first valve element, the second valve element being configured to open and close a hole of the first valve element, and a biasing member configured to bias the first valve element towards the second valve element, wherein a surface of the second valve element on an opposite side from the valve seat member is higher than the outer circumference valve seat of the valve seat member.

12 Claims, 8 Drawing Sheets

(51) Int. Cl.
- *B60G 13/08* (2006.01)
- *B60G 17/08* (2006.01)
- *F16F 9/348* (2006.01)
- *F16F 9/516* (2006.01)
- *F16K 15/14* (2006.01)
- *F16K 27/02* (2006.01)

(52) U.S. Cl.
CPC ........ *F16K 15/148* (2013.01); *F16K 27/0209* (2013.01); *B60G 13/08* (2013.01); *B60G 17/08* (2013.01); *B60G 2202/24* (2013.01); *B60G 2206/41* (2013.01); *B60G 2500/11* (2013.01); *B60G 2600/21* (2013.01); *B60G 2800/162* (2013.01); *F16F 9/187* (2013.01); *F16F 2222/12* (2013.01); *F16F 2228/066* (2013.01); *F16F 2232/08* (2013.01); *F16F 2234/02* (2013.01)

(58) Field of Classification Search
CPC ............. F16F 2228/066; F16F 2232/08; F16F 2234/04; F16K 15/148; F16K 27/0209; B60G 13/08; B60G 17/08; B60G 2202/24; B60G 2206/41; B60G 2500/11; B60G 2600/21; B60G 2800/162

See application file for complete search history.

(56) References Cited

U.S. PATENT DOCUMENTS

| | | | |
|---|---|---|---|
| 2011/0114428 A1* | 5/2011 | Vanbrabant | F16F 9/34 188/322.15 |
| 2015/0316118 A1* | 11/2015 | Smeljanskij | F16F 9/19 188/313 |
| 2015/0323037 A1* | 11/2015 | De Kock | F16F 9/185 188/313 |
| 2016/0258504 A1* | 9/2016 | Mizuno | F16F 9/3484 |
| 2017/0356522 A1 | 12/2017 | Kurita | |
| 2018/0216690 A1* | 8/2018 | Yamashita | F16F 9/185 |
| 2018/0340589 A1* | 11/2018 | Cheong | F16F 9/3485 |

FOREIGN PATENT DOCUMENTS

| | | |
|---|---|---|
| JP | 2006194336 A | 7/2006 |
| JP | 2015-086966 A | 5/2015 |

\* cited by examiner

DAMPING VALVE AND SHOCK ABSORBER

TECHNICAL FIELD

The present invention relates to a damping valve and a shock absorber.

BACKGROUND ART

A damping valve that is used for a piston unit, etc., of a shock absorber employed in a suspension of a vehicle is known. The damping valve is provided with a valve seat member and a main disc laminated on the valve seat member. The valve seat member has a port that allows operation chambers partitioned in the shock absorber to communicate with each other, and the port is opened and closed by the main disc.

In such a damping valve, an inner circumference of the main disc is fixedly supported, and the outer circumferential side of the main disc is allowed to undergo deformation. When a pressure on the upstream side of the port reaches the valve opening pressure, the main disc is deformed and opens the port by being separated from an annular valve seat provided on an outer circumference of the port of the valve seat member.

In addition, in the damping valve of the shock absorber, it is proposed to form an orifice hole in the main disc. When extension/compression speed of the shock absorber (a piston speed) is in a very low-speed region, working oil is allowed to flow through the orifice hole before the port of the main disc is opened. Thus, with the shock absorber provided with such a damping valve, the damping force suitable for a ride quality of the vehicle can be exhibited in accordance with the piston speed.

However, if the operation chambers are communicated with each other through the orifice hole all the time, the working oil flows through the same orifice hole both when the shock absorber is extended and compressed. Therefore, it is difficult to set a damping force characteristic (the characteristic of the damping force relative to the piston speed) on the extension-side and the damping force characteristic on the compression-side of the shock absorber independently from each other.

Thus, the damping valve in which the orifice hole can be opened/closed is proposed, and JP2015-86966A discloses a damping valve that is provided with a sub-disc between the main disc and the valve seat member for opening/closing the orifice hole. The sub-disc is formed to have an annular shape so as to have an outer diameter smaller than that of the main disc.

In this damping valve, an inner circumference of the sub-disc is fixedly supported together with a leaf valve, and the outer circumferential side of the sub-disc is allowed to undergo deformation. Because the outer diameter of the sub-disc is smaller than the outer diameter of the main disc, the sub-disc does not seat on the annular valve seat, but opens/closes the orifice hole by being seated on and separated from a surface of the main disc on the valve seat member side.

SUMMARY OF INVENTION

In the damping valve disclosed in JP2015-86966A, in order to set the valve opening pressure, the main disc is seated on the annular valve seat in a state in which an initial deformation is imparted. Specifically, there is a level difference between the inner circumferential side and the outer circumferential side of the main disc when viewed from the transverse direction.

In contrast, the sub-disc is provided between the main disc and the valve seat member in a state in which no load is exerted on the sub-disc, and the sub-disc faces the valve seat member-side surface of the main disc that is deformed so as to be projected towards the valve seat member side. Thus, in a no-load state in which the main disc and the sub-disc are not subjected to the load such as fluid force and pressure, a gap is formed between the sub-disc and the main disc. Therefore, the orifice hole is kept opened until the sub-disc is subjected to the fluid force or the pressure that is strong enough to cause the sub-disc to come into close contact with the main disc.

As described above, with the damping valve disclosed in JP2015-86966A, the sub-disc cannot close the orifice hole in the no-load state. Thus, when the shock absorber provided with the damping valve undergoes the extension/compression at a low speed, because an amount of the working oil flowing through the orifice hole is small, the orifice hole is not closed completely, and so, the working oil unavoidably flows through the orifice hole regard less of the extension/compression of the shock absorber.

In addition, as the extension/compression speed of the shock absorber is increased, the sub-disc is deformed and comes into close contact with the main disc so as to close the orifice hole, and therefore, a change in the damping force characteristic is caused between before and after the opening/closing of the orifice hole by the sub-disc.

An object of the present invention is to provide a damping valve capable of closing a throttle even in a no-load state.

According to one aspect of the present invention, a damping valve includes: a valve seat member having a port, an annular window communicated with an outlet end of the port, an inner circumference valve seat provided on an inner circumferential side of the annular window, and an outer circumference valve seat of the annular window; a first valve element formed to have an annular shape and stacked on the valve seat member, the first valve element being configured to open and close the annular window by being seated on and separated from the outer circumference valve seat, and the first valve element having a hole facing the annular window and forming a throttle or a passage in communication with a throttle; a second valve element formed to have an annular shape and provided between the inner circumference valve seat of the valve seat member and the first valve element, the second valve element being configured to open and close the hole; and a biasing member configured to bias the first valve element towards the second valve element, wherein a surface of the second valve element on an opposite side from the valve seat member is higher than the outer circumference valve seat of the valve seat member when viewed from a direction orthogonal to an axial direction of the valve seat member.

DESCRIPTION OF EMBODIMENTS

Figure 1:
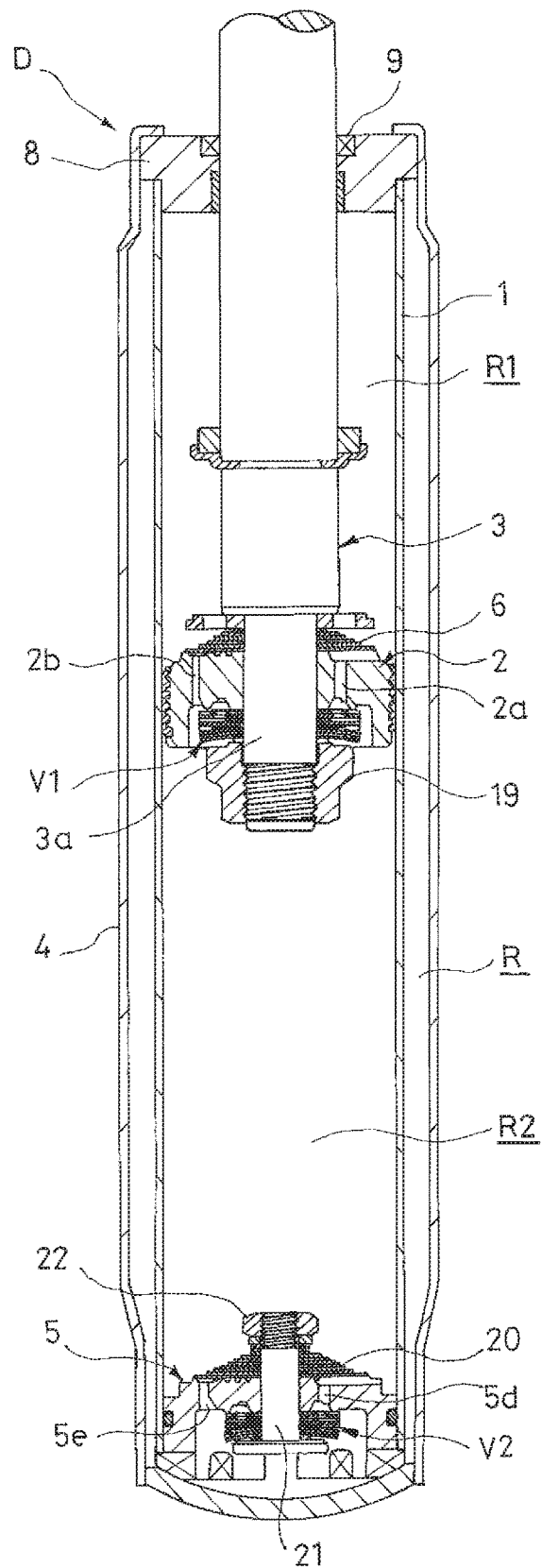
FIG. 1 is a sectional view of a shock absorber according to an embodiment of the present invention.

A damping valve and a shock absorber according to an embodiment of the present invention will be described below with reference to the drawings. As shown in FIG. 1, damping valves V1 and V2 according to this embodiment are used as an extension-side damping force generating unit of a piston unit and a compression-side damping force generating unit of a base unit in a shock absorber D.

Respective parts in the damping valves V1 and V2 and the shock absorber D will be described below in detail. The shock absorber D includes: a cylinder 1; a piston 2 that is inserted into the cylinder 1 in a freely movable manner; a piston rod 3 that is inserted into the cylinder 1; an outer tube 4 that covers the cylinder 1; a valve case 5 that is provided in an end portion of the cylinder 1; a piston-side valve 6 that is provided on a side of an extension-side chamber R1 in the piston 2; a case-side valve 20 that is provided on a side of a compression-side chamber R2 in the valve case 5; the damping valve V1 in the piston unit; and a damping valve V2 in the base unit. The piston 2 partitions an interior of the cylinder 1 into the extension-side chamber R1 and the compression-side chamber R2, and the piston rod 3 is linked to the piston 2. The outer tube 4 forms, together with the cylinder 1, a reservoir chamber R, and the valve case 5 divides the compression-side chamber R2 and the reservoir chamber R. The piston-side valve 6 opens and closes compression-side ports 2b that are provided in the piston 2, and the case-side valve 20 opens and closes suction ports 5e that are provided in the valve case 5.

The cylinder 1 is formed to have a tubular shape, and as described above, the piston 2 is movably inserted into the interior of the cylinder 1. By the piston 2, the interior of the cylinder 1 is partitioned into the extension-side chamber R1 on the upper side in FIG. 1 and the compression-side chamber R2 on the lower side in FIG. 1. The extension-side chamber R1 and the compression-side chamber R2 are filled with working oil serving as a fluid. The fluid is not limited to the working oil, and it may be MR fluid, ER fluid, water, aqueous solution, and so forth.

The outer tube 4 having a bottomed cylinder shape is arranged on the outer circumferential side of the cylinder 1, and the cylinder 1 is received in the outer tube 4. An annular space is provided between the cylinder 1 and the outer tube 4, and the working oil and a gas are filled in the annular space. In other words, the annular space serves as the reservoir chamber R. In order to prevent degradation of the working oil, it is preferable that the gas be an inert gas such as nitrogen gas, etc.

The valve case 5 is fitted into a one end portion (a lower end in FIG. 1) of the cylinder 1, and the valve case 5 divides the compression-side chamber R2 and the reservoir chamber R. A rod guide 8 that supports the piston rod 3 in a slidable and rotatable manner is fitted to an other end portion (an upper end in FIG. 1) of the cylinder 1. The rod guide 8 is fitted to an inner circumference of the outer tube 4, and seals between the outer tube 4 and the cylinder 1. On the upper side of the rod guide 8 in FIG. 1, a seal member 9 that seals between the cylinder 1 and the piston rod 3 is stacked. The rod guide 8 and the seal member 9 are fixed to the outer tube 4 by swaging an opening end (the upper end in FIG. 1) of the outer tube 4. By fixing the rod guide 8 to the outer tube 4 as described above, the cylinder 1 is clamped between the rod guide 8 and the valve case 5 mounted at a bottom portion of the outer tube 4, and the cylinder 1 is also fixed within the outer tube 4 together with the valve case 5. In the above, instead of swaging the opening end of the outer tube 4, a cap may be screwed to the opening end of the outer tube 4 to fix the seal member 9, the rod guide 8, the cylinder 1, and the valve case 5 in the outer tube 4 by clamping these members between the cap and the bottom portion of the outer tube 4.

Figure 2:
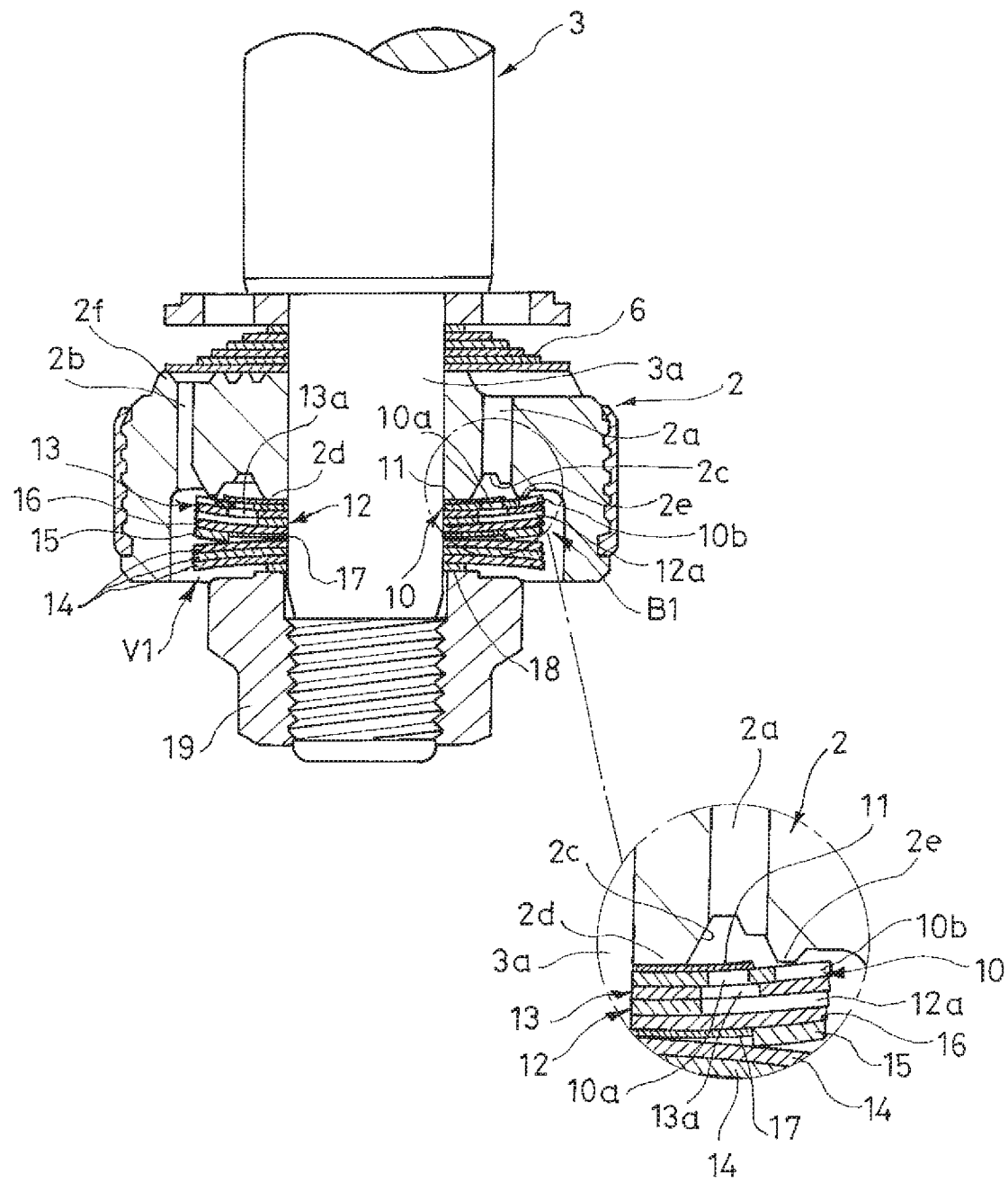
FIG. 2 is an enlarged sectional view of a piston in which a damping valve according to the embodiment of the present invention is applied.

As shown in FIGS. 1 and 2, the piston 2 is formed to have an annular shape and is fixed at a one end portion (the lower end in FIG. 1) of the piston rod 3. The piston 2 is provided with extension-side ports 2a that allows the extension-side chamber R1 to communicate with the compression-side chamber R2 and the compression-side ports 2b that allows the compression-side chamber R2 to communicate with the extension-side chamber R1. A plurality of extension-side ports 2a are provided in the piston 2 so as to be respectively arranged on the same circle centered at the center of the piston 2. In the compression-side chamber side end (a lower end in FIG. 2) of the piston 2, an annular window 2c that communicates with outlet ends (the opening ends on the lower side in FIG. 2) of the extension-side ports 2a is provided. The annular window 2c is an annular recessed portion that is formed apart from an inner circumference of the piston 2. In other words, the piston 2 is further provided with an annular inner circumference valve seat 2d that is formed by an inner circumference edge of the annular window 2c and an annular outer circumference valve seat 2e that is formed by an outer circumference edge of the annular window 2c. In the above, the number of each of the extension-side ports 2a and the compression-side ports 2b to be provided is arbitrary set, and only one of each may be used.

As shown in FIG. 2, when heights of the inner circumference valve seat 2d and the outer circumference valve seat 2e of the piston 2 are compared by viewing the piston 2 from the transverse direction (the direction orthogonal to the axial direction of the piston 2), the inner circumference valve seat 2d is formed so as to be higher than the outer circumference valve seat 2e. More specifically, a tip (the lower end in FIG. 2) of the inner circumference valve seat 2d is positioned towards a side of the compression-side chamber R2 that is the lower side in FIG. 2 relative to a tip (the lower end in FIG. 2) of the outer circumference valve seat 2e, and a difference in level is formed between them.

A plurality of the compression-side ports 2b are provided on the same circle on the outer circumferential side of the extension-side ports 2a. Inlet ends (opening ends on the lower side in FIG. 2) of the compression-side ports 2b are positioned at the outer side of the outer circumference valve seat 2e. In addition, the piston 2 is provided with a petal-shaped valve seat 2f that independently surrounds outlet ends (the opening ends on the upper side in FIG. 2) of the compression-side ports 2b, and the outlet ends of the compression-side ports 2b open independently at an upper end of the piston 2 without being communicated with each other. The petal-shaped valve seat 2f has surrounding portions that surround the respective compression-side ports 2b, and inlet ends (the opening ends on the upper side in FIG. 2) of the extension-side ports 2a are in communication with the extension-side chamber R1 through between adjacent surrounding portions of the petal-shaped valve seat 2f.

The piston-side valve 6 that is formed by laminating a plurality of annular plates is stacked on the side of the extension-side chamber R1 (the upper side in FIG. 2) in the piston 2. An inner circumference end of the piston-side valve 6 is fixed to the piston 2, and the outer circumferential side of the piston-side valve 6 is allowed to undergo the deformation. As the pressure in the compression-side chamber R2 (see FIG. 1) becomes higher than the pressure in the extension-side chamber R1 (see FIG. 1), the piston-side valve 6 is deformed by receiving the pressure in the compression-side chamber R2 through the compression-side ports 2b. As a result, the piston-side valve 6 is opened by being separated from the petal-shaped valve seat 2f. In other words, the piston-side valve 6 opens the compression-side ports 2b such that the compression-side chamber R2 and the extension-side chamber R1 are caused to be communicated. In contrast, as the pressure in the extension-side chamber R1 becomes higher than the pressure in the compression-side chamber R2, the piston-side valve 6 is pressed against the petal-shaped valve seat 2f by the pressure in the extension-side chamber R1 exerted from the back surface side. As a result, the piston-side valve 6 is closed by coming into close contact with the petal-shaped valve seat 2f. In other words, the piston-side valve 6 closes the compression-side ports 2b such that the communication between the compression-side chamber R2 and the extension-side chamber R1 is shut off. As described above, the piston-side valve 6 functions as a check valve that is seated on and separated from the petal-shaped valve seat 2f to open and close the compression-side ports 2b.

On the other hand, a part of the damping valve V1 is provided on the side of the compression-side chamber R2 (the lower side in FIG. 2) in the piston 2. The damping valve V1 includes: a first valve element 10 that is stacked on the piston 2; a second valve element 11 that is provided between the inner circumference valve seat 2d of the piston 2 and the first valve element 10; an orifice valve element 12 serving as a throttle valve element that is stacked on the opposite side of the first valve element 10 from the piston 2; and a biasing member B1 that biases the first valve element 10 towards the second valve element 11. The first valve element 10 is an annular plate member capable of opening and closing the annular window 2c by being seated on and separated from the outer circumference valve seat 2e. In addition, the first valve element 10 has holes 10a that face the annular window 2c. The second valve element 11 is an annular plate member that is capable of opening and closing the holes 10a of the first valve element 10. The orifice valve element 12 has orifices 12a serving as throttles that are in communication with the holes 10a of the first valve element 10.

As described above, the first valve element 10 is formed to have an annular shape, and an inner circumference end of the first valve element 10 is fixed to the inner circumference valve seat 2d of the piston 2 via the second valve element 11. The outer circumferential side of the first valve element 10 is allowed to undergo the deformation, and the first valve element 10 opens and closes the extension-side ports 2a by being seated on and separated from the outer circumference valve seat 2e. In other words, the first valve element 10 functions as a main valve element of the damping valve V1.

Figure 3:
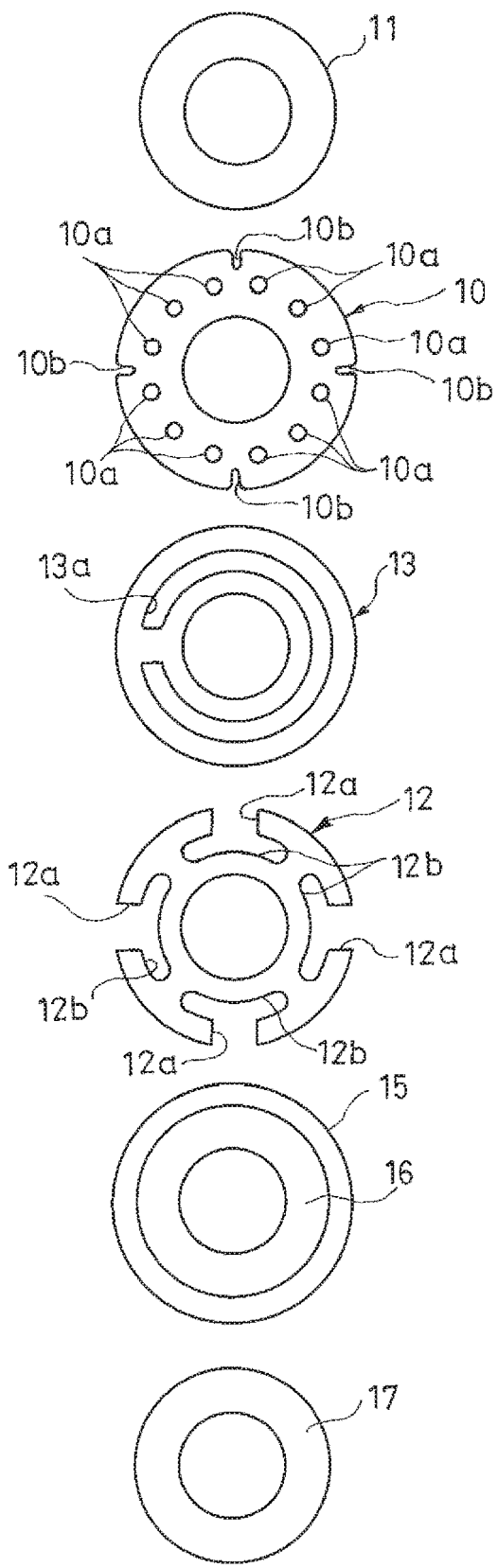
FIG. 3 is a plan view of constituent parts of the damping valve according to the embodiment of the present invention and shows the constituent parts without a valve seat member.

In addition, in this embodiment, as shown in FIG. 3, the first valve element 10 is provided with a plurality of fixed orifices 10b and the plurality of holes 10a that are arranged at positions facing the annular window 2c along the circumferential direction. The fixed orifices 10b are cutouts that are formed in an outer circumference of the first valve element 10. Therefore, in a state in which the first valve element 10 is seated on the outer circumference valve seat 2e, the first valve element 10 allows communication between the extension-side ports 2a and the compression-side chamber R2 through the fixed orifices 10b.

As shown in FIG. 2, the second valve element 11 is arranged between the first valve element 10 and the piston 2. As shown in FIG. 3, the second valve element 11 is an annular plate member, and as shown in FIG. 2, the second valve element 11 has the outer diameter that is smaller than the inner diameter of the outer circumference valve seat 2e and that is large enough to be able to open and close the holes 10a. The second valve element 11 is provided between the inner circumference valve seat 2d of the piston 2 and the first valve element 10, and an inner circumference end of the second valve element 11 is fixed to the inner circumference valve seat 2d. The outer circumferential side of the second valve element 11 is allowed to undergo the deformation, and the second valve element 11 opens and closes the holes 10a by being seated on and separated from the first valve element 10. In other words, the second valve element 11 functions as a sub-valve element of the damping valve V1.

The orifice valve element 12 is provided on the opposite side of the first valve element 10 from the piston 2. The orifice valve element 12 is an annular plate member, and the outer diameter of the orifice valve element 12 is substantially the same as the outer diameter of the first valve element 10. An inner circumference end of the orifice valve element 12 is a fixed end, and together with the first valve element 10, an outer circumference of the orifice valve element 12 is allowed to undergo the deformation. As shown in FIG. 3, the orifice valve element 12 is provided with four arc-shaped holes 12b that are arranged on the same circle and four orifices 12a that open at an outer circumference and that respectively communicate with the corresponding arc-shaped holes 12b.

In this embodiment, as shown in FIG. 2, a disc 13 is provided between the first valve element 10 and the orifice valve element 12. The disc 13 is an annular plate member, and the outer diameter of the disc 13 is substantially the same as the outer diameter of the first valve element 10. An inner circumference end of the disc 13 is an fixed end, and an outer circumference of the disc 13 is allowed to undergo the deformation together with the first valve element 10 and the orifice valve element 12. As shown in FIG. 3, the disc 13 is provided with a C-shaped cutout 13a facing the holes 10a of the first valve element 10 and the arc-shaped holes 12b of the orifice valve element 12. Thus, the holes 10a and the orifices 12a are in communication through the cutout 13a and the arc-shaped holes 12b, and the holes 10a function as passages to communicate with the orifices 12a. As the second valve element 11 opens the holes 10a, the extension-side chamber R1 and the compression-side chamber R2 are communicated through the holes 10a, the cutout 13a, the arc-shaped holes 12b, and the orifices 12a. As described above, the disc 13 functions so as to bring the cutout 13a to face with the holes 10a and the arc-shaped holes 12b such that the communication between them is achieved, and the disc 13 is provided to increase a degree of communication between the holes 10a and the arc-shaped holes 12b regardless of relative positions between the first valve element 10 and the orifice valve element 12 in the circumferential direction. If the degree of communication between the holes 10a of the first valve element 10 and the arc-shaped holes 12b of the orifice valve element 12 can be ensured at a certain level without providing the disc 13, the disc 13 may be omitted.

As shown in FIG. 2, the biasing member B1 is arranged on the opposite side of the first valve element 10 from the piston 2 and is stacked on the opposite side of the orifice valve element 12 from the piston 2. Specifically, the biasing member B1 is provided with annular plates 14 that are arranged on the opposite side of the first valve element 10 from the piston 2 and a ring 15 that is provided between the first valve element 10 and the annular plates 14. The annular plates 14 are members having elasticity, and the ring 15 is an annular plate member.

A plurality of annular plates 14 are provided by being laminated. Inner circumference ends of the annular plates 14 are fixed ends, and the outer circumferential sides of the annular plates 14 are allowed to undergo the deformation. The inner diameter of the ring 15 is larger than the inner diameters of the first valve element 10 and the annular plates 14, but is smaller than the outer diameters of the first valve element 10 and the annular plates 14. In this embodiment, as shown in FIG. 3, the ring 15 is attached to a ring holding annulus 16 that is stacked on the opposite side of the orifice valve element 12 from the piston 2 (see FIG. 2). The ring holding annulus 16 is an annular plate member, and the outer diameter of the ring holding annulus 16 is substantially the same as the outer diameter of the first valve element 10. An inner circumference end of the ring holding annulus 16 is a fixed end, and the outer circumferential side of the ring holding annulus 16 is allowed to undergo the deformation. The ring 15 is attached to an outer circumference of the ring holding annulus 16 by being welded or adhered. In addition, a spacer 17 that is thinner than the ring 15 is provided on the opposite side of the ring holding annulus 16 from the piston 2. The spacer 17 is an annular plate member, and the outer diameter of the spacer 17 is smaller than the inner diameter of the ring 15. An inner circumference end of the spacer 17 is a fixed end, and the outer circumferential side of the spacer 17 is allowed to undergo the deformation.

As shown in FIG. 2, a spacer member 18 is stacked on the opposite side of the annular plates 14 of the biasing member B1 from the piston 2. The spacer member 18 is formed to have an annular shape, and the outer diameter of the spacer member 18 is smaller than the outer diameters of the annular plates 14. The piston-side valve 6, the piston 2, the second valve element 11, the first valve element 10, the disc 13, the orifice valve element 12, the ring holding annulus 16, the spacer 17, three annular plates 14, and the spacer member 18 are assembled on an outer circumference of a small-diameter portion 3a that is provided on a lower end of the piston rod 3 in this order, and these members are fixed to the piston rod 3 by a piston nut 19 that is screwed into an end of the small-diameter portion 3a. At the time of the assembly, the ring 15 is attached to the ring holding annulus 16. In a state in which the piston-side valve 6, the second valve element 11, the first valve element 10, the disc 13, the orifice valve element 12, the ring holding annulus 16, the spacer 17, and the annular plates 14 are fixed to the piston rod 3 by the piston nut 19 screwed into the small-diameter portion 3a, the inner circumference ends of these member are fixed between the piston 2 and the piston nut 19 and the outer circumferences thereof are allowed to undergo the deformation.

Because the heights of the ring 15 and the spacer 17 are different when viewed from the transverse direction, the outer circumferences of the annular plates 14 are deformed downwards, and an initial deformation is imparted to the annular plates 14. Because the initial deformation is imparted to the annular plates 14 as described above, the annular plates 14 exhibit a biasing force pressing the first valve element 10 towards the piston 2 side, and thereby, the first valve element 10 is caused to be seated on the outer circumference valve seat 2e.

In other words, in this embodiment, the biasing member B1 biases the first valve element 10 by the elastic repulsive force exerted by the annular plates 14. Thus, the biasing member B1 sets a valve opening pressure of the first valve element 10 by the biasing force. The valve opening pressure is a differential pressure between the extension-side chamber R1 and the compression-side chamber R2 at the time when the first valve element 10 receives the pressure in the extension-side chamber R1 through the extension-side ports 2a and is separated from the outer circumference valve seat 2e. The valve opening pressure can be adjusted by the number of the annular plates 14 provided, and although three annular plates 14 are provided in this embodiment, the number of the annular plates 14 to be provided may be appropriately changed in accordance with the valve opening pressure required.

As shown in FIG. 2, because the inner circumference valve seat 2d is formed so as to be higher than the outer circumference valve seat 2e when the piston 2 is viewed from the transverse direction, the first valve element 10 is subjected to the biasing force exerted by the biasing member B1 and seated on the outer circumference valve seat 2e in a state in which the outer circumference of the first valve element 10 is deformed towards the side of the second valve element 11 that is positioned at the upper side in FIG. 2. As described above, while the first valve element 10 is deformed towards the second valve element 11 side, the second valve element 11 is also deformed towards the annular window 2c side by following the first valve element 10, and therefore, the second valve element 11 closes the holes 10a by coming into close contact with the surface of the first valve element 10 on the side of the piston 2. As described above, in a no-load state in which neither pressure nor fluid force acts on the damping valve V1, the second valve element 11 reliably closes the holes 10a by coming into close contact with the surface of the first valve element 10 on the side of the piston 2. In the above, in this embodiment, although the inner circumference valve seat 2d is formed so as to be higher than the outer circumference valve seat 2e when viewed from the transverse direction, even if the inner circumference valve seat 2d is formed so as to be lower than the outer circumference valve seat 2e, it suffices so long as the surface (the lower surface in FIG. 2) of the second valve element 11 on the opposite side from the piston 2 is positioned so as to be higher than the outer circumference valve seat 2e of the piston 2 serving as a valve seat member. By having the configuration described above, the fixing position of an inner circumference of the first valve element 10 becomes higher than the outer circumference valve seat 2e, and when the first valve element 10 is biased by the biasing member B1, the first valve element 10 comes into close contact with the second valve element 11 by being deformed towards the side (the upper side in FIG. 2) of the outer circumference valve seat 2e. In the above, it may be possible to form the surface (the lower surface in FIG. 2) of the second valve element 11 on the opposite side from the piston 2 so as to be higher than the outer circumference valve seat 2e of the piston 2 serving as the valve seat member by providing a spacer between the second valve element 11 and the inner circumference valve seat 2d. Also in this case, in a state in which the first valve element 10 is seated on the outer circumference valve seat 2e, the second valve element 11 can close the holes 10a by coming into close contact with the first valve element 10 by being deformed together with the first valve element 10. In the above, the surface (the lower surface in FIG. 2) of the second valve element 11 on the opposite side from the piston 2 may also be referred to as "a counter-piston side surface".

In the damping valve V1 configured as described above, even if the pressure in the extension-side chamber R1 becomes higher than the pressure in the compression-side chamber R2, the first valve element 10 is held in a state in which the first valve element 10 is seated on the outer circumference valve seat 2e until the differential pressure between the pressure in the extension-side chamber R1 and the pressure in the compression-side chamber R2 reaches the valve opening pressure. In this state, because the extension-side chamber R1 is communicated with the compression-side chamber R2 through the fixed orifices 10b, the working oil in the extension-side chamber R1 moves to the compression-side chamber R2 by flowing through the fixed orifices 10b only. In addition, because the second valve element 11 is in close contact with the first valve element 10 even in the no-load state and the second valve element 11 receives the pressure in the extension-side chamber R1 via the extension-side ports 2a, the second valve element 11 is kept in close contact with the first valve element 10 and closes the holes 10a that communicate with the orifices 12a. Thus, the working oil does not flow through the orifices 12a of the orifice valve element 12, and so, the orifices 12a do not function. In the above, in a case in which the fixed orifice is also provided in the piston-side valve 6 or the petal-shaped valve seat 2f, the working oil flows through the fixed orifices 10b in addition to the fixed orifice and moves from the extension-side chamber R1 to the compression-side chamber R2.

In the damping valve V1, as the pressure in the extension-side chamber R1 becomes higher than the pressure in the compression-side chamber R2 and the differential pressure between them reaches the valve opening pressure, the force pushing the first valve element 10 overcomes the biasing force exerted by the annular plates 14, and the first valve element 10 is deformed so as to be separated from the outer circumference valve seat 2e to open the damping valve V1. The extension-side ports 2a are opened as the damping valve V1 is opened, and the working oil then moves from the extension-side chamber R1 to the compression-side chamber R2 through an annular gap formed between the first valve element 10 and the outer circumference valve seat 2e. In the above, because the second valve element 11 is deformed together with the first valve element 10 by receiving the pressure from the extension-side chamber R1, a state in which the second valve element 11 is in close contact with the surface of the first valve element 10 on the side of the piston 2 is achieved, and the second valve element 11 closes the holes 10a so as not to allow the orifices 12a to function.

In addition, in the damping valve V1, when the pressure in the compression-side chamber R2 is higher than the pressure in the extension-side chamber R1, the first valve element 10 is pressed against the piston 2 by the pressure in the compression-side chamber R2 that is exerted from the back surface side and comes into close contact with the outer circumference valve seat 2e, thereby closing the extension-side ports 2a. In addition, the pressure in the compression-side chamber R2 acts on the second valve element 11 via the orifices 12a, the arc-shaped holes 12b, the cutout 13a, and the holes 10a, and thereby, the second valve element 11 is deformed towards the annular window 2c and separated from the first valve element 10 to open the holes 10a. Thus, as the pressure in the compression-side chamber R2 becomes higher than the pressure in the extension-side chamber R1, the compression-side chamber R2 is communicated with the extension-side chamber R1 through the fixed orifices 10b described above, and in addition, the second valve element 11 opens the holes 10a such that the compression-side chamber R2 is also communicated with the extension-side chamber R1 through the orifices 12a.

As described above, in the damping valve V1, in a case in which the pressure in the extension-side chamber R1 is higher than the pressure in the compression-side chamber R2, but the differential pressure therebetween is small, the working oil flows through the fixed orifices 10b. In a case in which the pressure in the compression-side chamber R2 is higher than the pressure in the extension-side chamber R1, but the differential pressure therebetween is small, the working oil flows through the fixed orifices 10b and the orifices 12a. With the damping valve V1 configured as described above, because the second valve element 11 can reliably close the holes 10a in the no-load state by coming into close contact with the first valve element 10, the problem in which the damping characteristic varies during an operation in which the working oil flows from the extension-side chamber R1 towards the compression-side chamber R2 is eliminated, and the orifices 12a may reliably function as the orifices of a single operation type.

In the above, the holes 10a in the first valve element 10 may function as the orifices. In such a case, a disc may be provided instead of the orifice valve element 12, and the orifice valve element 12 may be omitted. This disc is an annular plate member that preferably be provided with arc-shaped holes similarly to those in the orifice valve element 12 and cutouts that open at the outer circumference and respectively communicates with the arc-shaped holes. In addition, the shape and structure of the piston 2 serving as the valve seat member are not limited to those described above, and their design may be appropriately modified.

Figure 4:
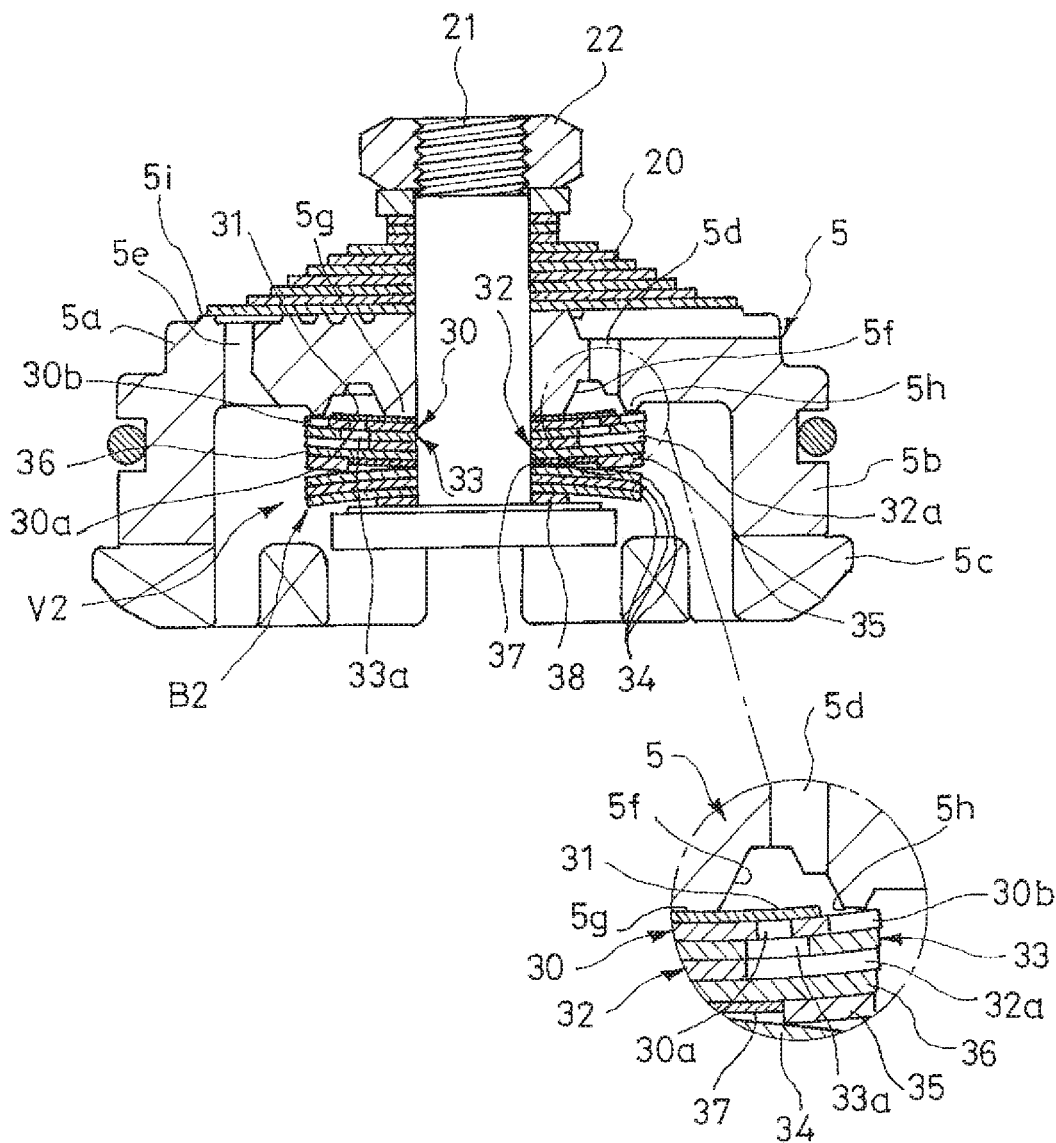
FIG. 4 is an enlarged sectional view of a valve case in which the damping valve according to the embodiment of the present invention is applied.

As shown in FIGS. 1 and 4, the valve case 5 is configured to be provided with a small-diameter portion 5a that is formed to have an annular shape, a tubular-shaped skirt 5b that is provided on a lower-end outer circumference of the small-diameter portion 5a, a cutout 5c that is formed in the skirt 5b, and damping ports 5d and the suction ports 5e serving as ports that are formed in the small-diameter portion 5a. The small-diameter portion 5a has a small diameter and is fitted into a lower end of the cylinder 1. The inside and the outside of the skirt 5b are communicated through the cutout 5c. The damping ports 5d and the suction ports 5e extend from compression-side chamber end (the upper end in FIG. 1) facing the compression-side chamber R2 to a counter-compression-side chamber end facing an interior of the skirt 5b.

In the above, in this embodiment, a plurality of the damping ports 5d are provided on the same circle on the valve case 5. Similarly to the damping ports 5d, a plurality of the suction ports 5e are provided on the valve case 5 on a circle having a diameter that is larger than that of the circle on which the damping ports 5d are provided. The number of each of the damping ports 5d and the suction ports 5e to be provided is arbitrary set, and only one of each may be used.

The valve case 5 is fixed to the outer tube 4 by being clamped between the outer tube 4 and the cylinder 1. Specifically, the small-diameter portion 5a is fitted into the end portion of the cylinder 1, and a lower end of the skirt 5b is brought into contact with the bottom portion of the outer tube 4. The valve case 5 divides the compression-side chamber R2 and the reservoir chamber R. In addition, upper-end opening ends of both of the damping ports 5*d* and the suction ports 5*e* face the compression-side chamber R2, and lower-end opening ends thereof communicate with the reservoir chamber R via the cutout 5*c* provided in the skirt 5*b*. In other words, the compression-side chamber R2 and the reservoir chamber R are communicated via the damping ports 5*d* and the suction ports 5*e*.

The valve case 5 is the valve seat member in the damping valve V2, and the damping valve V2 and the case-side valve 20 are fixed to an outer circumference of a guide rod 21 that is inserted into an inner circumference of the valve case 5.

In addition, the valve case 5 serving as the valve seat member is provided with, on a reservoir-chamber side end (the lower end in FIG. 4), an annular window 5*f* that communicates with outlet ends (the opening ends on the lower side in FIG. 4) of the damping ports 5*d* serving as the ports. The annular window 5*f* is an annular recessed portion that is formed apart from the inner circumference of the valve case 5. In other words, the valve case 5 is provided with an annular inner circumference valve seat 5*g* that is formed by an inner circumference edge of the annular window 5*f* and an annular outer circumference valve seat 5*h* that is formed by an outer circumference edge of the annular window 5*f*.

As shown in FIG. 4, when heights of the inner circumference valve seat 5*g* and the outer circumference valve seat 5*h* of the valve case 5 are compared by viewing the valve case 5 from the transverse direction (the direction orthogonal to the axial direction of the valve case 5), the inner circumference valve seat 5*g* is formed so as to be higher than the outer circumference valve seat 5*h*. More specifically, an tip (the lower end in FIG. 4) of the inner circumference valve seat 5*g* is positioned towards a side of the reservoir chamber R that is the lower side in FIG. 4 relative to a tip (the lower end in FIG. 4) of the outer circumference valve seat 5*h*, and a difference in level is formed between them.

In addition, the valve case 5 is provided with petal-shaped valve seat 5*i* that independently surrounds outlet ends (the opening ends on the upper side in FIG. 4) of the suction ports 5*e*, and the respective outlet ends of the suction ports 5*e* open independently at an upper end of the valve case 5 without being communicated with each other. The petal-shaped valve seat 5*i* has a surrounding portions that surround the respective suction ports 5*e*, and inlet ends (the opening end on the upper side in FIG. 2) of the damping ports 5*d* are in communication with the compression-side chamber R2 through between adjacent surrounding portions of the petal-shaped valve seat 5*i*.

The case-side valve 20 that is formed by laminating a plurality of annular plates is stacked on the side of the compression-side chamber R2 (the upper side in FIG. 4) in the valve case 5. An inner circumference end of the case-side valve 20 is fixed to the valve case 5, and the outer circumferential side of the case-side valve 20 is allowed to undergo the deformation. As the pressure in the reservoir chamber R (see FIG. 1) becomes higher than the pressure in the compression-side chamber R2 (see FIG. 1), the case-side valve 20 is deformed by receiving the pressure in the reservoir chamber R through the suction ports 5*e*. As a result, the case-side valve 20 is opened by being separated from the petal-shaped valve seat 5*i*. In other words, the case-side valve 20 opens the suction ports 5*e* such that the reservoir chamber R and the compression-side chamber R2 are caused to be communicated. In contrast, as the pressure in the compression-side chamber R2 becomes higher than the pressure in the reservoir chamber R, the case-side valve 20 is pressed against the petal-shaped valve seat 5*i* by the pressure in the compression-side chamber R2 exerted from the back surface side. As a result, the case-side valve 20 is closed by coming into close contact with the petal-shaped valve seat 5*i*. In other words, the case-side valve 20 closes the suction ports 5*e* such that the communication between the compression-side chamber R2 and the reservoir chamber R is shut off. As described above, the case-side valve 20 functions as the check valve that is seated on and separated from the petal-shaped valve seat 5*i* to open and close the suction port 5*e*.

On the other hand, a part of the damping valve V2 is provided on the side of the reservoir chamber R (the lower side in FIG. 4) in the valve case 5. The damping valve V2 includes: a first valve element 30 that is stacked on the valve case 5; a second valve element 31 that is provided between the inner circumference valve seat 5*g* of the valve case 5 and the first valve element 30; an orifice valve element 32 serving as the throttle valve element that is stacked on the opposite side of the first valve element 30 from the valve case 5; and a biasing member B2 that biases the first valve element 30 towards the second valve element 31. The first valve element 30 is an annular plate member capable of opening and closing the annular window 5*f* by being seated on and separated from the outer circumference valve seat 5*h*. In addition, the first valve element 30 has holes 30*a* that face the annular window 5*f*. The second valve element 31 is an annular plate member that is capable of opening and closing the holes 30*a* of the first valve element 30. The orifice valve element 32 has orifices 32*a* serving as the throttles that are in communication with the holes 30*a* of the first valve element 30.

As described above, the first valve element 30 is formed to have an annular shape, and an inner circumference end of the first valve element 30 is fixed to the inner circumference valve seat 5*g* of the valve case 5 via the second valve element 31. The outer circumferential side of the first valve element 30 is allowed to undergo the deformation, and the first valve element 30 opens and closes the damping ports 5*d* by being seated on and separated from the outer circumference valve seat 5*h*. In other words, the first valve element 30 functions as the main valve element of the damping valve V2. In addition, in this embodiment, the first valve element 30 is provided with a plurality of fixed orifices 30*b* and the plurality of holes 30*a* that are arranged at positions facing the annular window 5*f* along the circumferential direction. The fixed orifices 30*b* are cutouts that are formed in an outer circumference of the first valve element 30. Therefore, in a state in which the first valve element 30 is seated on the outer circumference valve seat 5*h*, the first valve element 30 allows communication between the damping ports 5*d* and the reservoir chamber R through the fixed orifices 30*b*. In the above, because a plan view of constituent parts of the damping valve V2 is substantially the same as the plan view of the constituent parts of the damping valve V1 shown in FIG. 3, the illustration thereof is omitted here.

The second valve element 31 is arranged between the first valve element 30 and the valve case 5. The second valve element 31 is an annular plate member, and the second valve element 31 has the outer diameter that is smaller than the inner diameter of the outer circumference valve seat 5*h* and that is large enough to be able to open and close the holes 30*a*. The second valve element 31 is provided between the inner circumference valve seat 5*g* of the valve case 5 and the first valve element 30, and an inner circumference end of the second valve element 31 is fixed to the inner circumference valve seat 5g. The outer circumferential side of the second valve element 31 is allowed to undergo the deformation, and the second valve element 31 opens and closes the holes 30a by being seated on and separated from the first valve element 30. In other words, the second valve element 31 functions as the sub-valve element of the damping valve V2.

The orifice valve element 32 is provided on the opposite side of the first valve element 30 from the valve case 5. The orifice valve element 32 is an annular plate member, and the outer diameter of the orifice valve element 32 is substantially the same as the outer diameter of the first valve element 30. An inner circumference end of the first valve element 30 is a fixed end, and together with the first valve element 30, an outer circumference of the orifice valve element 32 is allowed to undergo the deformation. Similarly to the orifice valve element 12 (see FIG. 3), the orifice valve element 32 is provided with four arc-shaped holes 32b that are arranged on the same circle and four orifices 32a that open at an outer circumference and that respectively communicate with the corresponding arc-shaped holes 32b.

In this embodiment, a disc 33 is provided between the first valve element 30 and the orifice valve element 32. The disc 33 is an annular plate member, and the outer diameter of the disc 33 is substantially the same as the outer diameter of the first valve element 30. An inner circumference end of the disc 33 is a fixed end, and an outer circumference of the disc 33 is allowed to undergo the deformation together with the first valve element 30 and the orifice valve element 32. Similarly to the disc 13 (see FIG. 3), the disc 33 is provided with a C-shaped cutout 33a facing the holes 30a of the first valve element 30 and the arc-shaped holes 32b of the orifice valve element 32. Thus, the holes 30a and the orifices 32a are in communication through the cutout 33a and the arc-shaped holes 32b, and the holes 30a function as passages to communicate with the orifices 32a. As the second valve element 31 opens the holes 30a, the compression-side chamber R2 and the reservoir chamber R are communicated through the holes 30a, the cutout 33a, the arc-shaped holes 32b, and the orifices 32a. As described above, the disc 33 functions so as to bring the cutout 33a to face with the holes 30a and the arc-shaped holes 32b such that the communication between them is achieved, and the disc 33 is provided to increase a degree of communication between the holes 30a and the arc-shaped holes 32b regardless of relative positions between the first valve element 30 and the orifice valve element 32 in the circumferential direction. If the degree of communication between the holes 30a of the first valve element 30 and the arc-shaped holes 32b of the orifice valve element 32 can be ensured at a certain level without providing the disc 33, the disc 33 may be omitted.

The biasing member B2 is arranged on the opposite side of the first valve element 30 from the valve case 5 and is stacked on the opposite side of the orifice valve element 32 from the valve case 5. Specifically, the biasing member B2 is provided with annular plates 34 that are arranged on the opposite side of the first valve element 30 from the valve case 5 and a ring 35 that is provided between the first valve element 30 and the annular plates 34. The annular plates 34 are members having elasticity, and the ring 35 is an annular plate member.

A plurality of annular plates 34 are provided by being laminated. Inner circumference ends of the annular plates 34 are fixed ends, and the outer circumferential sides of the annular plates 14 are allowed to undergo the deformation. The inner diameter of the ring 35 is larger than the inner diameters of the first valve element 30 and the annular plates 34, but is smaller than the outer diameters of the first valve element 30 and the annular plates 34. In this embodiment, the ring 35 is attached to a ring holding annulus 36 that is stacked on the opposite side of the orifice valve element 32 from the valve case 5. Similarly to the ring holding annulus 16 (see FIG. 3), the ring holding annulus 36 is an annular plate member, and the outer diameter of the ring holding annulus 36 is substantially the same as the outer diameter of the first valve element 30. An inner circumference end of the ring holding annulus 36 is a fixed end, and the outer circumferential side of the ring holding annulus 36 is allowed to undergo the deformation. The ring 35 is attached to an outer circumference of the ring holding annulus 36 by being welded or adhered. In addition, a spacer 37 that is thinner than the ring 35 is provided on the opposite side of the ring holding annulus 36 from the valve case 5. The spacer 37 is an annular plate member, and the outer diameter of the spacer 37 is smaller than the ring 35. An inner circumference end of the spacer 37 is a fixed end, and the outer circumferential side of the spacer 37 is allowed to undergo the deformation.

A spacer member 38 is stacked on the opposite side of the annular plates 34 of the biasing member B2 from the valve case 5. The spacer member 38 is formed to have an annular shape, and the outer diameter of the spacer member 38 is smaller than the outer diameters of the annular plates 34. The case-side valve 20, the valve case 5, the second valve element 31, the first valve element 30, the disc 33, the orifice valve element 32, the ring holding annulus 36, the spacer 37, three annular plates 34, and the spacer member 38 are assembled on an outer circumference of the guide rod 21 in this order, and these members are fixed to the guide rod 21 by a nut 22 that is screwed into an end of the guide rod 21. At the time of the assembly, the ring 35 is attached to the ring holding annulus 36. In a state in which the case-side valve 20, the second valve element 31, the first valve element 30, the disc 33, the orifice valve element 32, the ring holding annulus 36, the spacer 37, and the annular plates 34 are fixed to the guide rod 21 by the nut 22 screwed, the inner circumference ends of these members are fixed between a head portion of the guide rod 21 and the nut 22 and the outer circumferences thereof are allowed to undergo the deformation.

Because the heights of the ring 35 and the spacer 37 are different when viewed from the transverse direction, the outer circumferences of the annular plates 34 are deformed downwards, and the initial deformation is imparted to the annular plates 34. Because the initial deformation is imparted to the annular plates 34 as described above, the annular plates 34 exhibit the biasing force pressing the first valve element 30 towards the valve case 5 side, and thereby, the first valve element 30 is caused to be seated on the outer circumference valve seat 5h.

In other words, in this embodiment, the biasing member B2 biases the first valve element 30 by the elastic repulsive force exerted by the annular plates 34. Thus, the biasing member B2 sets the valve opening pressure of the first valve element 30 by the biasing force. The valve opening pressure is a differential pressure between the compression-side chamber R2 and the reservoir chamber R at the time when the first valve element 30 receives the pressure in the compression-side chamber R2 through the damping ports 5d and is separated from the outer circumference valve seat 5h. The valve opening pressure can be adjusted by the number of the annular plates 34 provided, and although three annular plates 34 are provided in this embodiment, the number of the annular plates 34 to be provided may be appropriately changed in accordance with the valve opening pressure required.

As shown in FIG. 4, because the inner circumference valve seat 5g is formed so as to be higher than the outer circumference valve seat 5h when the valve case 5 is viewed from the transverse direction, the first valve element 30 is subjected to the biasing force exerted by the biasing member B2 and seated on the outer circumference valve seat 5h in a state in which the outer circumference of the first valve element 30 is deformed towards the side of the second valve element 31 that is positioned at the upper side in FIG. 4. As described above, while the first valve element 30 is deformed towards the second valve element 31 side, the second valve element 31 is also deformed towards the annular window 5f side by following the first valve element 30, and therefore, the second valve element 31 closes the holes 30a by coming into close contact with the surface of the first valve element 30 on the side of the valve case 5. As described above, in a no-load state in which neither pressure nor fluid force acts on the damping valve V2, the second valve element 31 reliably closes the holes 30a by coming into close contact with the surface of the first valve element 30 on the side of the valve case 5. In the above, in this embodiment, although the inner circumference valve seat 5g is formed so as to be higher than the outer circumference valve seat 5h when viewed from the transverse direction, even if the inner circumference valve seat 5g is formed so as to be lower than the outer circumference valve seat 5h, it suffices so long as the surface (the lower surface in FIG. 4) of the second valve element 31 on the opposite side from the valve case 5 is positioned so as to be higher than the outer circumference valve seat 5h of the valve case 5 serving as the valve seat member. By having the configuration described above, the fixing position of an inner circumference of the first valve element 30 becomes higher than the outer circumference valve seat 5h, and when the first valve element 30 is biased by the biasing member B2, the first valve element 30 comes into close contact with the second valve element 31 by being deformed towards the outer circumference valve seat 5h side (the upper side in FIG. 4). In the above, it may be possible to form the surface (the lower surface in FIG. 4) of the second valve element 31 on the opposite side from the valve case 5 so as to be higher than the outer circumference valve seat 5h of the valve case 5 serving as the valve seat member by providing a spacer between the second valve element 31 and the inner circumference valve seat 5g. Also in this case, in a state in which the first valve element 30 is seated on the outer circumference valve seat 5h, the second valve element 31 can close the holes 30a by coming into close contact with the first valve element 30 by being deformed together with the first valve element 30. In the above, the surface of the second valve element 31 on the opposite side from the valve case 5 may also be referred to as "a counter-valve case side surface".

In the damping valve V2 configured as described above, even if the pressure in the compression-side chamber R2 becomes higher than the pressure in the reservoir chamber R, the first valve element 30 is held in a state in which the first valve element 30 is seated on the outer circumference valve seat 5h until the differential pressure between the pressure in the compression-side chamber R2 and the pressure in the reservoir chamber R reaches the valve opening pressure. In this state, because the compression-side chamber R2 is communicated with the reservoir chamber R through the fixed orifices 30b, the working oil in the compression-side chamber R2 moves to the reservoir chamber R by flowing through the fixed orifices 30b only. In addition, because the second valve element 31 is in close contact with the first valve element 30 even in the no-load state and the second valve element 31 receives the pressure in the compression-side chamber R2 via the damping ports 5d, the second valve element 31 is kept in close contact with the first valve element 30 and closes the holes 30a that communicate with the orifices 32a. Thus, the working oil does not flow through the orifices 32a of the orifice valve element 32, and so, the orifices 32a do not function.

In the damping valve V2, as the pressure in the compression-side chamber R2 becomes higher than the pressure in the reservoir chamber R and the differential pressure between them reaches the valve opening pressure, the force pushing the first valve element 30 overcomes the biasing force exerted by the annular plates 34, and the first valve element 30 is deformed so as to be separated from the outer circumference valve seat 5h to open the damping valve V2. The damping ports 5d are opened as the damping valve V2 is opened, and the working oil then moves from the compression-side chamber R2 to the reservoir chamber R through an annular gap formed between the first valve element 30 and the outer circumference valve seat 5h. In the above, because the second valve element 31 is deformed together with the first valve element 30 by receiving the pressure from the compression-side chamber R2, a state in which the second valve element 31 is in close contact with the surface of the first valve element 30 on the side of the valve case 5 is achieved, and the second valve element 31 closes the holes 30a so as not to allow the orifices 32a to function.

In addition, in the damping valve V2, when the pressure in the reservoir chamber R is higher than the pressure in the compression-side chamber R2, the first valve element 30 is pressed against the valve case 5 by the pressure in the reservoir chamber R that is exerted from the back surface side and comes into close contact with the outer circumference valve seat 5h, thereby closing the damping ports 5d. In addition, the pressure in the reservoir chamber R acts on the second valve element 31 via the orifices 32a, the arc-shaped holes 32b, the cutout 33a, and the holes 30a, and thereby, the second valve element 31 is deformed towards the annular window 5f side and separated from the first valve element 30 to open the holes 30a. Thus, as the pressure in the reservoir chamber R becomes higher than the pressure in the compression-side chamber R2, the reservoir chamber R is communicated with the compression-side chamber R2 through the fixed orifices 30b described above, and in addition, the second valve element 31 opens the holes 30a such that the reservoir chamber R is also communicated with the compression-side chamber R2 through the orifices 32a.

As described above, in the damping valve V2, in a case in which the pressure in the compression-side chamber R2 is higher than the pressure in the reservoir chamber R, but the differential pressure therebetween is small, the working oil flows through the fixed orifices 30b. In a case in which the pressure in the reservoir chamber R is higher than the pressure in the compression-side chamber R2, but the differential pressure therebetween is small, the working oil flows through the fixed orifices 30b and the orifices 32a. With the damping valve V2 configured as described above, because the second valve element 31 can reliably close the holes 30a in the no-load state by coming into close contact with the first valve element 30, the problem in which the damping characteristic varies during an operation in which the working oil flows from the compression-side chamber R2 towards the reservoir chamber R is eliminated, and the orifices 32a may reliably function as the orifices of the single operation type.

In the above, the holes 30a in the first valve element 30 may function as the orifices. In such a case, a disc may be provided instead of the orifice valve element 32, and the orifice valve element 32 may be omitted. This disc is an annular plate member that preferably be provided with arc-shaped holes similarly to those in the orifice valve element 32 and cutouts that open at the outer circumference and respectively communicates with the arc-shaped holes. In addition, the shape and structure of the valve case 5 serving as the valve seat member are not limited to those described above, and their design may be appropriately modified.

Figure 5:
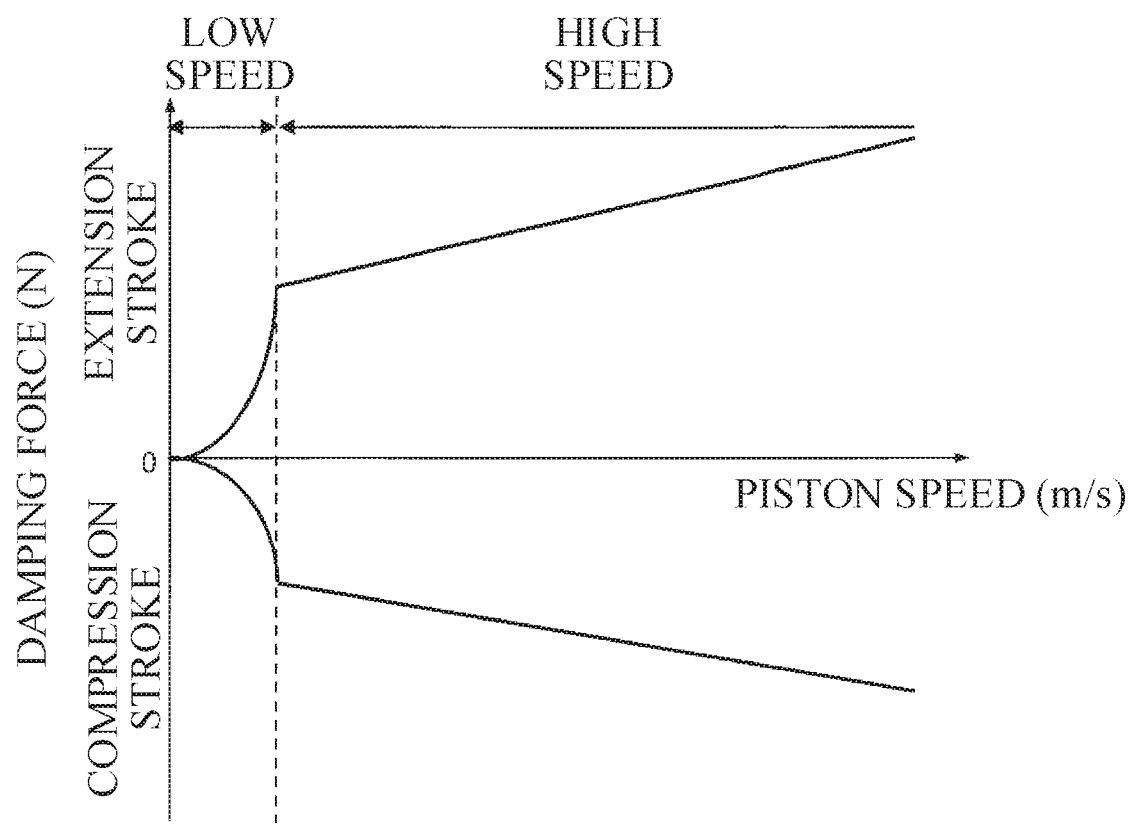
FIG. 5 is a diagram showing a damping force characteristic of the shock absorber according to the embodiment of the present invention.

The damping valves V1 and V2 and the shock absorber D are configured as described above. Next, action of the shock absorber D will be described. First of all, a case in which the shock absorber D is extended, in other words, a case in which the piston 2 moves towards the upper side in FIG. 1 with respect to the cylinder 1 will be described. When the shock absorber D is in an extension stroke, the extension-side chamber R1 is compressed, and the compression-side chamber R2 is expanded. When the piston speed (the moving speed of the piston 2 relative to the cylinder 1) is low, although the pressure in the extension-side chamber R1 becomes higher than the pressure in the compression-side chamber R2, the differential pressure between them does not reach the valve opening pressure of the first valve element 10. Therefore, the first valve element 10 in the damping valve V1 is held in a state in which the first valve element 10 is seated on the outer circumference valve seat 2e, and the working oil moves from the extension-side chamber R1 to the compression-side chamber R2 through the fixed orifices 10b. Thus, when the piston speed falls within a low-speed region during the extension stroke, as shown in FIG. 5, the shock absorber D exhibits the damping force by the fixed orifices 10b and exhibits the damping force having the characteristic that is proportional to the square of the piston speed specific to the orifice.

In addition, at the time of the extension stroke of the shock absorber D, the piston rod 3 moves out from the interior of the cylinder 1. Therefore, the working oil becomes insufficient in the cylinder 1 by an amount corresponding to the volume of the piston rod 3 moving out from the cylinder 1. When the piston speed is low, although the case-side valve 20 provided in the valve case 5 is not opened because the differential pressure between the reservoir chamber R and the compression-side chamber R2 is small, the second valve element 31 of the damping valve V2 is deformed and opens the holes 30a. Thus, the working oil is supplied from the reservoir chamber R into the cylinder 1 through the fixed orifices 30b and the orifices 32a by the amount corresponding to the insufficient volume in the cylinder 1. In other words, when the shock absorber D is extended at low piston speed, not only the fixed orifices 30b, but also the orifices 32a become available.

As the piston speed during the extension stroke becomes high speed, the differential pressure between the extension-side chamber R1 and the compression-side chamber R2 is increased, and the differential pressure between them reaches the valve opening pressure of the first valve element 10. As a result, the force pushing the first valve element 10 overcomes the biasing force exerted by the biasing member B1, and thereby, the first valve element 10 is deformed and separated from the outer circumference valve seat 2e to open the extension-side ports 2a. The working oil flows through the annular gap formed between the first valve element 10 and the outer circumference valve seat 2e and moves from the extension-side chamber R1 to the compression-side chamber R2. In addition, because the differential pressure between the reservoir chamber R and the compression-side chamber R2 is increased, the case-side valve 20 provided in the valve case 5 is opened to open the suction ports 5e. Therefore, the working oil is supplied from the reservoir chamber R into the cylinder 1 through the suction ports 5e by the amount corresponding to the insufficient volume in the cylinder 1. Therefore, when the piston speed falls within a high-speed region during the extension stroke, as shown in FIG. 5, the shock absorber D exhibits the damping force by the first valve element 10 and the biasing member B1 and exhibits the damping force having the characteristic that is proportional to the piston speed.

In addition, when the piston speed falls within the low-speed region during the extension stroke, the working oil flowing from the reservoir chamber R to the compression-side chamber R2 can flow through both of the fixed orifices 30b and the orifices 32a. In other words, it is possible to ensure increased flow-passage area by opening the second valve element 31. As the piston speed reaches the high-speed region, although the case-side valve 20 is opened to open the suction ports 5e, it is possible to reduce the degree of change in the flow-passage area between before and after opening of the case-side valve 20, and therefore, it is possible to suppress the pressure change in the compression-side chamber R2.

Next, a case in which the shock absorber D is compressed, in other words, a case in which the piston 2 moves towards the lower side in FIG. 1 with respect to the cylinder 1 will be described. When the shock absorber D is in a compression stroke, the compression-side chamber R2 is compressed, and the extension-side chamber R1 is expanded. When the piston speed is low, although the pressure in the compression-side chamber R2 becomes higher than the pressure in the extension-side chamber R1, the differential pressure between them is small. Therefore, the piston-side valve 6 is not opened. On the other hand, the second valve element 11 of the damping valve V1 is deformed to open the holes 10a. Thus, the working oil moves from the compression-side chamber R2 towards the extension-side chamber R1 through the fixed orifices 10b and the orifices 12a. In other words, in a case in which the shock absorber D is compressed at low piston speed, not only the fixed orifices 10b, but also the orifices 12a become available.

In addition, at the time of the compression stroke of the shock absorber D, the piston rod 3 moves into the cylinder 1. Therefore, the working oil becomes excessive in the cylinder 1 by an amount corresponding to the volume of the piston rod 3 moving into the cylinder 1. When the piston speed is low, because the differential pressure between the compression-side chamber R2 and the reservoir chamber R is small, the first valve element 30 of the damping valve V2 is not opened. Therefore, the working oil moves from the compression-side chamber R2 to the reservoir chamber R through the fixed orifices 30b. Thus, when the piston speed falls within the low-speed region during the compression stroke, as shown in FIG. 5, the shock absorber D exhibits the damping force by the fixed orifices 30b and exhibits the damping force having the characteristic that is proportional to the square of the piston speed specific to the orifice.

As the piston speed during the compression stroke becomes high speed, the differential pressure between the compression-side chamber R2 and the reservoir chamber R is increased, and the differential pressure between them reaches the valve opening pressure of the first valve element 30. As a result, the force pushing the first valve element 30 overcomes the biasing force exerted by the biasing member B2, and thereby, the first valve element 30 is deformed and separated from the outer circumference valve seat 5h to open the damping ports 5d. The working oil moves from the compression-side chamber R2 to the reservoir chamber R by flowing through the annular gap formed between the first valve element 30 and the outer circumference valve seat 5h. In addition, because the differential pressure between the compression-side chamber R2 and the extension-side chamber R1 is increased, the piston-side valve 6 provided in the piston 2 is opened to open the compression-side ports 2b. Therefore, when the piston speed falls within the high-speed region during the compression stroke, as shown in FIG. 5, the shock absorber D exhibits the damping force by the first valve element 30 and the biasing member B2 and exhibits the damping force having the characteristic that is proportional to the piston speed.

In addition, when the piston speed falls within the low-speed region during the compression stroke, the working oil flowing from the compression-side chamber R2 to the extension-side chamber R1 can flow through both of the fixed orifices 10b and the orifices 12a. In other words, it is possible to ensure increased flow-passage area by opening the second valve element 11. As the piston speed reaches the high-speed region, although the piston-side valve 6 is opened to open the compression-side ports 2b, it is possible to reduce the degree of change in the flow-passage area between before and after opening of the piston-side valve 6, and therefore, it is possible to suppress the pressure change in the extension-side chamber R1.

As described above, the shock absorber D includes: the cylinder 1; the piston 2 that is inserted into the cylinder 1 in a freely movable manner, the piston 2 being configured to partition the interior of the cylinder 1 into the extension-side chamber R1 and the compression-side chamber R2; the piston rod 3 that is inserted into the cylinder 1 and linked to the piston 2; the outer tube 4 that covers the cylinder 1 so as to form the reservoir chamber R between the outer tube 4 and the cylinder 1; the valve case 5 that is provided in the end portion of the cylinder 1, the valve case 5 being configured to divide the compression-side chamber R2 and the reservoir chamber R; the piston-side valve 6 that is provided on the extension-side chamber R1 side of the piston 2, the piston-side valve 6 being configured to open and close the compression-side ports 2b provided in the piston 2; the case-side valve 20 that is provided on the side of the compression-side chamber R2 in the valve case 5, the case-side valve 20 being configured to open and close the suction ports 5e provided in the valve case 5; the damping valve V1 that is applied to the side of the compression-side chamber R2 in the piston unit; and the damping valve V2 that is applied to the side of the reservoir chamber R in a valve case portion.

With the shock absorber D configured as described above, it is possible to suppress the change in the pressure in the compression-side chamber R2 between before and after opening of the case-side valve 20 during the extension stroke, and it is possible to suppress change in the pressure in the extension-side chamber R1 between before and after opening of the piston-side valve 6 during the compression stroke. Thus, with the shock absorber D configured as described above, it is possible to reliably close the orifices 12a, 32a serving as the throttles even in the no-load state, to suppress generation of the noise, and to improve the ride quality in the vehicle when it is used in the suspension of the vehicle.

In addition, in a case in which the damping valve V1 is applied to the side of the compression-side chamber R2 in the piston unit and a leaf valve is provided in the valve case 5 instead of the first valve element 30, the second valve element 31, the biasing member B2, and so forth of the damping valve V2, at the time of the compression stroke of the shock absorber D, it is possible to suppress the change in the pressure in the extension-side chamber R1 between before and after opening of the piston-side valve 6, and to prevent the generation of the noise. If the noise is not generated at the time of the extension stroke of the shock absorber D, as described above, the damping valve V1 may be applied only to the side of the compression-side chamber R2 in the piston unit. Furthermore, in a case in which the damping valve V2 is applied to the side of the reservoir chamber R in the valve case portion and the leaf valve is provided in the piston 2 instead of the first valve element 10, the second valve element 11, the biasing member B1, and so forth of the damping valve V1, at the time of the extension stroke of the shock absorber D, it is possible to suppress the change in the pressure in the compression-side chamber R2 between before and after opening of the case-side valve 20 and to prevent the generation of the noise. If the noise is not generated at the time of the compression stroke of the shock absorber D, as described above, the damping valve V2 may be applied only to the side of the reservoir chamber R in the valve case portion.

The damping valve V1, V2 according to this embodiment includes: the valve seat member 2, 5 having ports (the extension-side ports 2a, the damping ports 5d), the annular window 2c, 5f that is communicated with the outlet ends of the ports (the extension-side ports 2a, the damping ports 5d), the inner circumference valve seat 2d, 5g provided on the inner circumferential side of the annular window 2c, 5f, and the outer circumference valve seat 2e, 5h of the annular window 2c, 5f; the first valve element 10, 30 that is formed to have an annular shape and that is stacked on the valve seat member 2, 5, the first valve element 10, 30 being capable of opening and closing the annular window 2c, 5f by being seated on and separated from the outer circumference valve seat 2e, 5h, and the first valve element 10, 30 having the holes 10a, 30a facing the annular window 2c, 5f and forming the orifice (the throttle) 12a or the passage in communication with the orifice (the throttle) 12a; the second valve element 11, 31 that is formed to have an annular shape and is provided between the inner circumference valve seat 2d, 5g of the valve seat member 2, 5 and the first valve element 10, 30, the second valve element 11, 31 bring capable of opening and closing the holes 10a, 30a; and the biasing member B1, B2 configured to bias the first valve element 10, 30 towards the second valve element 11, 31, wherein a surface of the second valve element 11, 31 on the opposite side from the valve seat member 2, 5 is higher than the outer circumference valve seat 2e, 5h of the valve seat member 2, 5 when viewed from the direction orthogonal to the axial direction of the valve seat member 2, 5.

In the damping valve V1, V2 configured as described above, the second valve element 11, 31 can close the holes 10a, 30a by coming into close contact with the first valve element 10, 30 in the no-load state. Thus, with the damping valve V1, V2 of this embodiment, it is possible to reliably close the holes 10a, 30a even in the no-load state, to eliminate the problem in which the damping characteristic varies, and to allow the orifices (the throttles) 12a, 32a to reliably function as the orifice (the throttle) of the single operation type.

In addition, by applying the damping valve V1, V2 configured as described above to the shock absorber D, the orifices (the throttles) 12a, 32a can be set as the orifice (the throttle) of the single operation type that functions only at the time of the extension stroke or the compression stroke of the shock absorber D, and therefore, it is possible to independently set the damping force characteristic at the time of the extension stroke and the damping force characteristics at the time of the compression stroke of the shock absorber D.

Furthermore, the biasing member B1, B2 in the damping valve V1, V2 of this embodiment has the annular plates 14, 34 having elasticity that are arranged on the opposite side of the first valve element 10, 30 from the valve seat member 2, 5 and the ring 15, 35 that is formed to have an annular shape and provided between the first valve element 10, 30 and the annular plates 14, 34, the ring 15, 35 having the inner diameter that is larger than the inner diameters of the first valve element 10, 30 and the annular plates 14, 34, but smaller than the outer diameters of the first valve element 10, 30 and the annular plates 14, 34. With the damping valve V1, V2 configured as described above, because the configuration of the biasing member B1, B2 is simple and a length in the axial direction is made shorter, the stroke length of the shock absorber D is not compromised even if it is applied to the shock absorber D, and therefore, it is also possible to avoid increase in the overall length of the shock absorber D.

Figure 6:
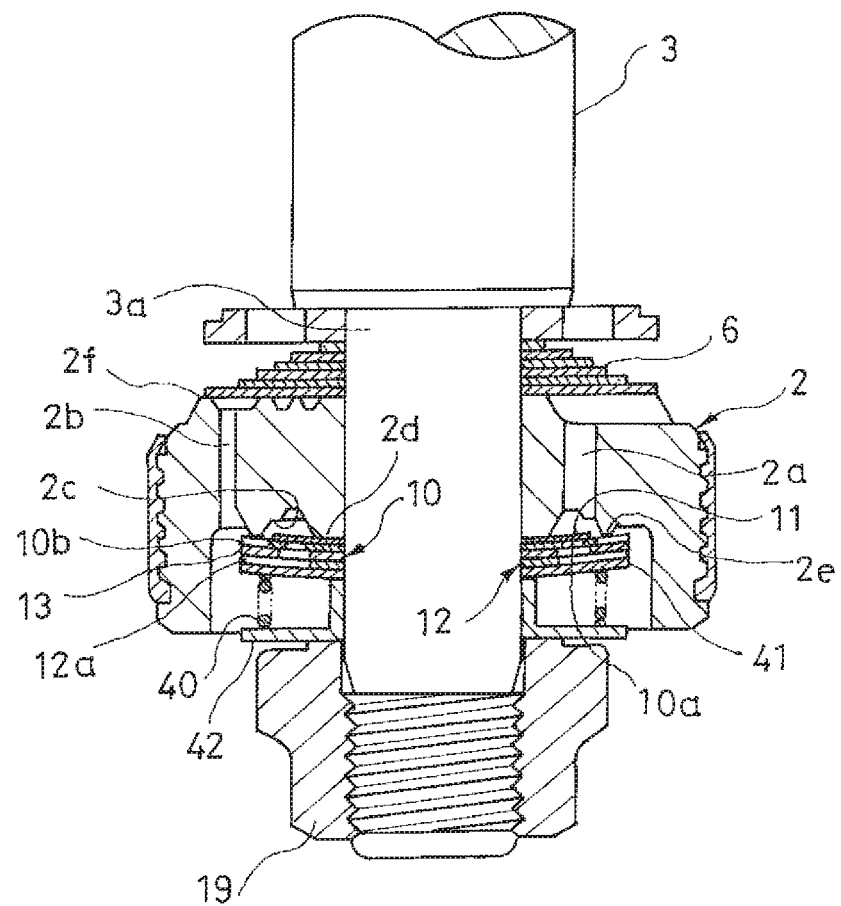
FIG. 6 is an enlarged sectional view of the piston in which the damping valve according to a first modification of the embodiment of the present invention is applied.

In the above, as shown in FIG. 6, the biasing member B1 may be formed of an elastic body 40. In the example shown in FIG. 6, a disc 41 is stacked on the orifice valve element 12. The outer diameter of the disc 41 is substantially the same as the outer diameter of the orifice valve element 12, and the disc 41 prevents the arc-shaped holes 12b of the orifice valve element 12 from communicating with the compression-side chamber R2 without passing through the orifices 12a. The elastic body 40 is provided between the disc 41 and a stopper 42 that is fixed to an end of the piston rod 3 in a compressed state. The elastic body 40 may be, for example, a spring, such as a coil spring, a belleville spring, and so forth, a rubber, and so forth. In addition, in a case in which this configuration is employed, the second valve element 11, the first valve element 10, the disc 13, the orifice valve element 12, and the disc 41 are provided so as to be movable in the axial direction with respect to the piston rod 3, and it may be possible to employ a configuration in which these components are integrally separated from the piston 2 serving as the valve seat member by the compression of the elastic body 40. The configuration of the biasing member B1 in the damping valve V1 shown in FIG. 6 may also be applied to the biasing member B2 of the damping valve V2 in the valve case portion.

In addition, the damping valve V1, V2 of this embodiment is formed to have an annular shape and is stacked on the opposite side of the first valve element 10, 30 from the valve seat member 2, 5, the damping valve V1, V2 including the orifice valve element (the throttle valve element) 12, 32 that has the orifices (the throttles) 12a, 32a communicating with the holes 10a, 30a. With the damping valve V1, V2 configured as described above, because the orifice valve element (the throttle valve element) 12, 32 is provided, it is possible to make the opening area of the orifices (the throttles) 12a, 32a constant regardless of the relative positions of the first valve element 10, 30 and the orifice valve element 12, 32 in the circumferential direction. Although the holes 10a, 30a may be use as the orifices (the throttle), the degree of communication between the holes 10a, 30a and the cutout 13a, 33a through which the holes 10a, 30a communicate with the compression-side chamber R2 or the reservoir chamber R varies depending on the relative positions of the first valve element 10, 30 and the disc 13, 33 in the circumferential direction. Therefore, in a case in which the holes 10a, 30a are used as the orifices (the throttles), it is necessary to align the first valve element 10, 30 and the disc 13, 33 in the circumferential direction during the assembly thereof. On the other hand, in a case in which the orifice valve element (the throttle valve element) 12, 32 is provided, because the opening area of the orifices (the throttles) 12a, 32a does not change, the assembly work of the damping valve V1, V2 becomes easier, and it is possible to exhibit the damping force at the orifices (the throttles) 12a, 32a whose opening area is kept constant all the time.

In the above-described embodiment, although the orifice is used as the throttle, the throttle is not limited to the orifice, and it may be a choke. Specifically, the throttle valve element that is provided with the choke instead of the orifice 12a, 32a may be provided instead of the orifice valve element 12, 32.

In addition, in the damping valve V1, V2 of this embodiment, because the fixed orifices 10b, 30b is provided, it is possible to independently set the damping force characteristics of the shock absorber D on both extension and compression sides only by the damping valve V1, V2. In the above, in this embodiment, although the fixed orifices 10b, 30b are provided by the cutouts that are formed on the outer circumference of the first valve element 10, 30, recessed portions through which the annular window 2c, 5f communicates with the compression-side chamber R2 or with the reservoir chamber R may be provided in the outer circumference valve seat 2e, 5h, and the recessed portions may be used as the fixed orifices.

In the above, in this embodiment, although the damping valve V1 is applied to the side of the compression-side chamber R2 n the piston unit, the damping valve V1 may also be applied to the side of the extension-side chamber R1 in the piston unit. In addition, in this embodiment, although the damping valve V2 is applied to the reservoir chamber R in the valve case portion, the damping valve V2 may also be applied to the side of the compression-side chamber R2 in the valve case portion. Regardless of the configuration of the shock absorber D, the advantages of the damping valve V1, V2 in that the orifice can be reliably closed even in the no-load state and the problem in which the damping characteristic varies is eliminated are maintained.

Figure 7:
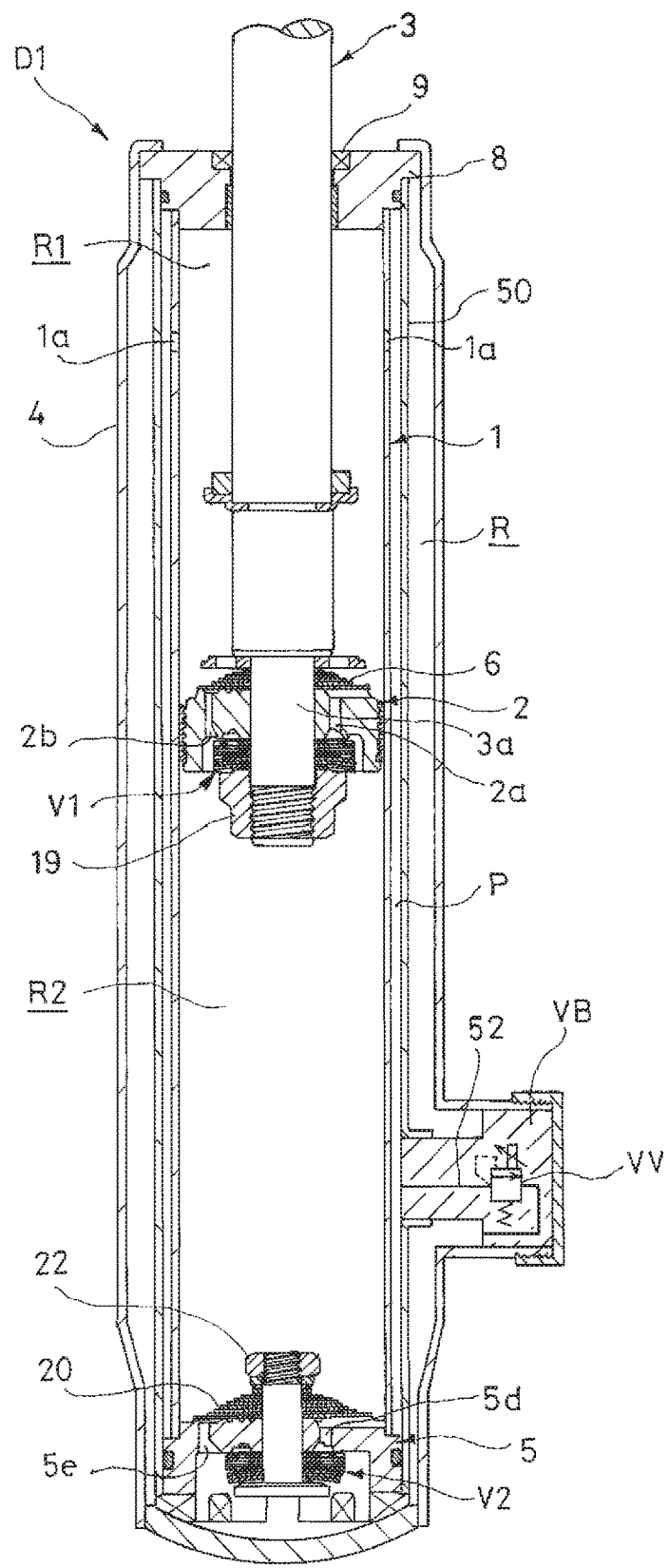
FIG. 7 is a sectional view of the shock absorber according to a second modification of the embodiment of the present invention.

In addition, as shown in FIG. 7, the damping valve V1, V2 may be applied to a uniflow shock absorber D1 capable of changing the damping force. The shock absorber D1 includes, in addition to the configuration of the shock absorber D, a middle tube 50 between the cylinder 1 and the outer tube 4. A first annular space is formed between the cylinder 1 and the middle tube 50, and the first annular space communicates with the extension-side chamber R1 through a hole 1a provided in the cylinder 1. A second annular space is formed between the outer tube 4 and the middle tube 50, and the second annular space serves as the reservoir chamber R. Furthermore, the shock absorber D1 includes a valve block VB on a side portion of the lower part of the outer tube 4. The valve block VB includes a passage 52 through which the first annular space and the reservoir chamber R are communicated and a variable damping valve VV that is provided in the passage 52. In other words, the reservoir chamber R is communicated with the first annular space through the variable damping valve VV. A damping passage P is formed by the first annular space and the passage 52.

The variable damping valve VV is provided in the passage 52, allows only a flow of the working oil from the extension-side chamber R1 to the reservoir chamber R without passing through the compression-side chamber R2, and imparts resistance to the flow of the working oil flowing through the damping passage P.

The variable damping valve VV is a so-called solenoid controlled valve including a solenoid, and the variable damping valve VV is configured so as to be able to impart the resistance to the working oil flowing from the extension-side chamber R1 to the reservoir chamber R through the damping passage P and so as to be able to adjust the valve opening pressure by a current sent to the solenoid. The variable damping valve VV configured as described above functions as a pressure control valve that adjusts the valve opening pressure depending on the amount of the current flowing through the solenoid, and thereby, the damping force generated by the shock absorber can be adjusted. In the above, as the variable damping valve VV, any other damping valve than the damping valve, which is capable of changing the damping force by adjusting the valve opening pressure, may be employed as long as the damping force can be adjusted.

Next, action of the shock absorber D1 configured as described above will be described. First of all, a case in which the shock absorber D1 is extended, in other words, a case in which the piston 2 moves towards the upper side in FIG. 7 with respect to the cylinder 1 will be described. When the shock absorber D1 is in the extension stroke, the extension-side chamber R1 is compressed, and the compression-side chamber R2 is expanded. When the piston speed (the moving speed of the piston 2 relative to the cylinder 1) is low, although the pressure in the extension-side chamber R1 becomes higher than the pressure in the compression-side chamber R2, the differential pressure between them does not reach the valve opening pressure of the first valve element 10. Therefore, the first valve element 10 in the damping valve V1 is held in a state in which the first valve element 10 is seated on the outer circumference valve seat 2e. By lowering the valve opening pressure of the variable damping valve VV, the variable damping valve VV is opened and the working oil moves from the extension-side chamber R1 to the reservoir chamber R through the damping passage P. In addition, by increasing the valve opening pressure of the variable damping valve VV, the variable damping valve VV is held closed, and therefore, the working oil moves from the extension-side chamber R1 to the compression-side chamber R2 through the fixed orifices 10b.

Figure 8:
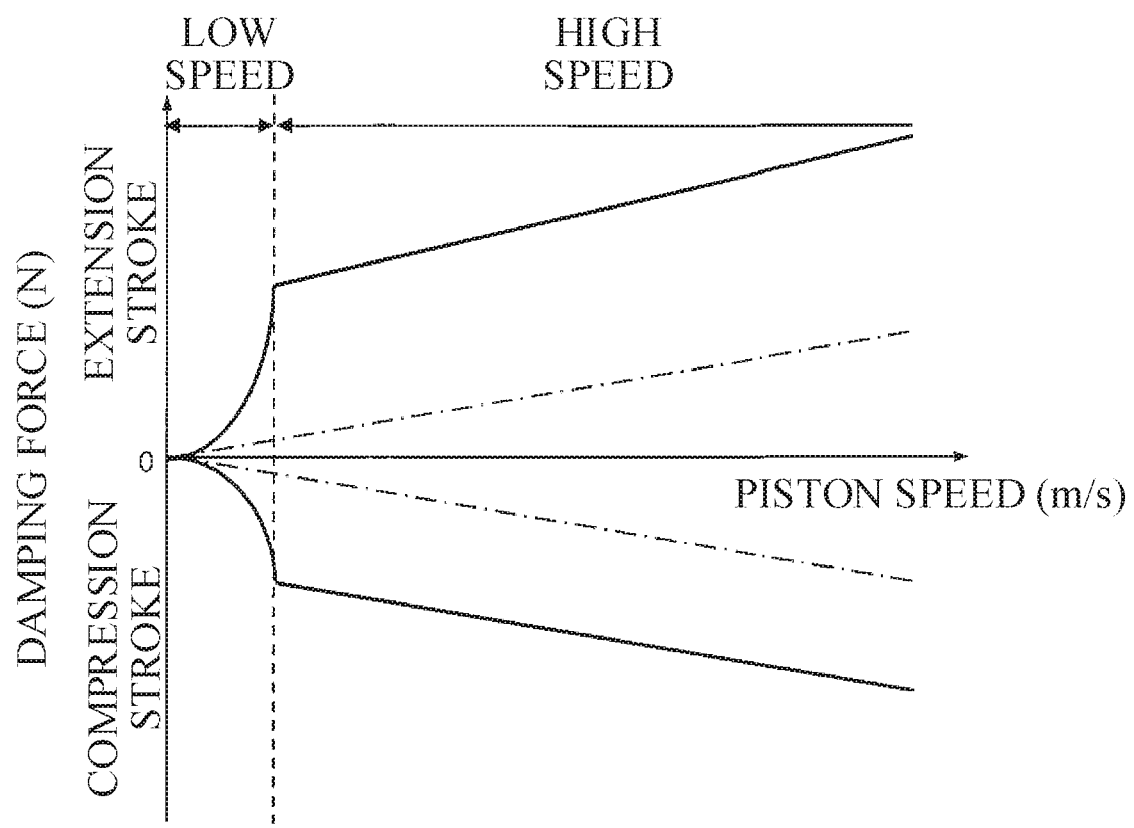
FIG. 8 is a diagram showing the damping force characteristic of the shock absorber according to the second modification of the embodiment of the present invention.

Thus, when the piston speed falls within the low-speed region during the extension stroke, as shown in FIG. 8, in the shock absorber D, by adjusting the variable damping valve VV, it is possible to adjust the damping force within a range from the damping force when the valve opening pressure of the variable damping valve VV is minimized (a one-dot chain line in FIG. 8) to the damping force that is generated only by the fixed orifices 10b (a solid line in FIG. 8).

In addition, at the time of the extension stroke of the shock absorber D1, the piston rod 3 moves out from the cylinder 1. Therefore, the working oil in the cylinder 1 becomes insufficient by an amount corresponding to the volume of the piston rod 3 moving out from the cylinder 1. When the piston speed is low, although the case-side valve 20 provided in the valve case 5 is not opened because the differential pressure between the reservoir chamber R and the compression-side chamber R2 is small, the second valve element 31 of the damping valve V2 is deformed and opens the holes 30a. Thus, the working oil is supplied from the reservoir chamber R into the cylinder 1 through the fixed orifices 30b and the orifices 32a by the amount corresponding to the insufficient volume in the cylinder 1. In other words, when the shock absorber D is extended at low piston speed, not only the fixed orifices 30b, but also the orifices 32a become available.

As the piston speed during the extension stroke becomes high speed, the differential pressure between the extension-side chamber R1 and the compression-side chamber R2 is increased. Until the differential pressure between the extension-side chamber R1 and the compression-side chamber R2 reaches the valve opening pressure of the first valve element 10, the pressure in the extension-side chamber R1 can be adjusted by performing adjustment of the valve opening pressure of the variable damping valve VV. When the differential pressure between the extension-side chamber R1 and the compression-side chamber R2 reaches the valve opening pressure of the first valve element 10, the force pushing the first valve element 10 overcomes the biasing force exerted by the biasing member B1, and thereby, the first valve element 10 is deformed and separated from the outer circumference valve seat 2e to open the extension-side ports 2a. The working oil is caused to flow through the annular gap formed between the first valve element 10 and the outer circumference valve seat 2e and move from the extension-side chamber R1 to the compression-side chamber R2. In addition, because the differential pressure between the reservoir chamber R and the compression-side chamber R2 is increased, the case-side valve 20 provided in the valve case 5 is opened to open the suction ports 5e. Therefore, the working oil is supplied from the reservoir chamber R into the cylinder 1 through the suction ports 5e by the amount corresponding to the insufficient volume in the cylinder 1.

Therefore, when the piston speed falls within the high-speed region during the extension stroke, as shown in FIG. 8, in the shock absorber D1, by adjusting the variable damping valve VV, it is possible to adjust the damping force within the range from the damping force when the valve opening pressure of the variable damping valve VV is minimized (the one-dot chain line in FIG. 8) to the damping force that is generated by the first valve element 10 (the solid line in FIG. 8). The first valve element 10 in the damping valve V1 applied to the shock absorber D1 as described above functions as a relief valve for determining the maximum damping force at the time of the extension stroke.

In addition, when the piston speed falls within the low-speed region during the extension stroke, the working oil flowing from the reservoir chamber R to the compression-side chamber R2 can flow through both of the fixed orifices 30b and the orifices 32a. In other words, it is possible to ensure increased flow-passage area by opening the second valve element 31. As the piston speed reaches the high-speed region, although the case-side valve 20 is opened to open the suction ports 5e, it is possible to reduce the degree of change in the flow-passage area between before and after opening of the case-side valve 20, and therefore, it is possible to suppress the pressure change in the compression-side chamber R2.

Next, a case in which the shock absorber D1 is compressed, in other words, a case in which the piston 2 moves towards the lower side in FIG. 1 with respect to the cylinder 1 will be described. When the shock absorber D1 is in a compression stroke, the compression-side chamber R2 is compressed, and the extension-side chamber R1 is expanded. When the piston speed is low, the pressure in the compression-side chamber R2 becomes higher than the pressure in the extension-side chamber R1. Because the differential pressure between the compression-side chamber R2 and the extension-side chamber R1 is small, the piston-side valve 6 is not opened. On the other hand, the second valve element 11 of the damping valve V1 is deformed to open the holes 10a. Thus, the working oil moves from the compression-side chamber R2 towards the extension-side chamber R1 through the fixed orifices 10b and the orifices 12a. In other words, in a case in which the shock absorber D1 is compressed at low piston speed, not only the fixed orifices 10b, but also the orifices 12a become available.

In addition, at the time of the compression stroke of the shock absorber D1, the piston rod 3 moves into the cylinder 1. Therefore, the working oil becomes excessive in the cylinder 1 by an amount corresponding to the volume of the piston rod 3 moving into the cylinder 1. When the piston speed is low, because the differential pressure between the compression-side chamber R2 and the reservoir chamber R is small, the first valve element 30 of the damping valve V2 is not opened. By lowering the valve opening pressure of the variable damping valve VV, the variable damping valve VV is opened and the working oil moves from the extension-side chamber R1 to the reservoir chamber R through the damping passage P. In addition, by increasing the valve opening pressure of the variable damping valve VV, the variable damping valve VV is held closed, and therefore, the working oil moves from the compression-side chamber R2 to the reservoir chamber R through the fixed orifices 30b.

Thus, when the piston speed falls within the low-speed region during the compression stroke, as shown in FIG. 8, in the shock absorber D1, by adjusting the variable damping valve VV, it is possible to adjust the damping force within the range from the damping force when the valve opening pressure of the variable damping valve VV is minimized (the one-dot chain line in FIG. 8) to the damping force that is generated only by the fixed orifices 30b (the solid line in FIG. 8).

As the piston speed during the compression stroke becomes high speed, the differential pressure between the compression-side chamber R2 and the reservoir chamber R is increased. In this circumstance, the differential pressure between the compression-side chamber R2 and the extension-side chamber R1 is increased. Therefore, the piston-side valve 6 provided in the piston 2 is opened. The compression-side ports 2b is opened, and the differential pressure between the compression-side chamber R2 and the extension-side chamber R1 is maintained at about the valve opening pressure of the piston-side valve 6. Until the differential pressure between the compression-side chamber R2 and the reservoir chamber R reaches the valve opening pressure of the first valve element 30, the pressure in the cylinder 1 can be adjusted by performing adjustment of the valve opening pressure of the variable damping valve VV. In addition, as the differential pressure between the compression-side chamber R2 and the reservoir chamber R reaches the valve opening pressure of the first valve element 30, the force pushing the first valve element 30 overcomes the biasing force exerted by the biasing member B2, and thereby, the first valve element 30 is deformed and separated from the outer circumference valve seat 5h to open the damping ports 5d. The working oil moves from the compression-side chamber R2 to the reservoir chamber R by flowing through the annular gap formed between the first valve element 30 and the outer circumference valve seat 5h.

Thus, when the piston speed falls within the high-speed region during the compression stroke, as shown in FIG. 8, in the shock absorber D1, by adjusting the variable damping valve VV, it is possible to adjust the damping force within the range from the damping force when the valve opening pressure of the variable damping valve VV is minimized (the one-dot chain line in FIG. 8) to the damping force that is generated by the first valve element 30 (the solid line in FIG. 8). The first valve element 30 in the damping valve V2 applied to the shock absorber D1 as described above functions as a relief valve for determining the maximum damping force at the time of the compression stroke.

In addition, when the piston speed falls within the low-speed region during the compression stroke, the working oil flowing from the compression-side chamber R2 to the extension-side chamber R1 can flow through both of the fixed orifices 10b and the orifices 12a. In other words, it is possible to ensure increased flow-passage area by opening the second valve element 11. As the piston speed reaches the high-speed region, although the piston-side valve 6 is opened to open the compression-side ports 2b, it is possible to reduce the degree of change in the flow-passage area between before and after opening of the piston-side valve 6, and therefore, it is possible to suppress the pressure change in the extension-side chamber R1.

As understood on the basis of the above description, the shock absorber D1 essentially behaves as a uniflow shock absorber in which the working oil flows from the cylinder 1 to the reservoir chamber R through the variable damping valve VV during both of the extension and compression. In addition, when the pressure in the extension-side chamber R1 becomes excessive, the first valve element 10 functions as the relief valve, and when the compression-side chamber R2 pressure becomes excessive, the first valve element 30 functions as the relief valve.

As described above, the shock absorber D1 is provided with: the cylinder 1; the piston 2 that is inserted into the cylinder 1 in a freely movable manner, the piston 2 being configured to partition the interior of the cylinder 1 into the extension-side chamber R1 and the compression-side chamber R2; the piston rod 3 that is inserted into the cylinder 1 and linked to the piston 2; the outer tube 4 that is arranged on the outer circumference of the cylinder 1 so as to form the reservoir chamber R in an interior of the outer tube 4; the valve case 5 that is provided in the end portion of the cylinder 1, the valve case 5 being configured to divide the compression-side chamber R2 and the reservoir chamber R; the piston-side valve 6 that is provided on the side of the extension-side chamber R1 in the piston 2, the piston-side valve 6 being configured to open and close the compression-side ports 2b provided in the piston 2; the case-side valve 20 that is provided on the side of the compression-side chamber R2 in the valve case 5, the case-side valve 20 being configured to open and close the suction ports 5e provided in the valve case 5; the damping passage P configured to allow communication between the extension-side chamber R1 and the reservoir chamber R; the variable damping valve VV that is provided in the damping passage P, the variable damping valve VV being configured to impart resistance to the flow of the fluid flowing from the extension-side chamber R1 towards the reservoir chamber R; the damping valve V1 that is applied to the side of the compression-side chamber R2 in the piston unit; and the damping valve V2 that is applied to the side of the reservoir chamber R in a valve case portion.

With the shock absorber D1 configured as described above, it is possible to suppress the change in the pressure in the compression-side chamber R2 between before and after opening of the case-side valve 20 during the extension stroke, and it is possible to suppress change in the pressure in the extension-side chamber R1 between before and after opening of the piston-side valve 6 during the compression stroke. Thus, with the shock absorber D1 configured as described above, it is possible to reliably close the orifices 12a, 32a even in the no-load state, to suppress the generation of the noise, and to improve the ride quality in the vehicle when it is used in the suspension of the vehicle.

In addition, when the piston speed falls within the low-speed region during the extension stroke, as described above, the damping force range adjustable by the variable damping valve VV is the range from the damping force when the valve opening pressure of the variable damping valve VV is minimized to the damping force that is generated only by the fixed orifices 10b. Thus, in a case in which a damping force adjustable range during the extension stroke needs to be increased, it suffices to increase the damping force generated by reducing the flow-passage area of the fixed orifices 10b. Even if the damping force adjustable range is increased by reducing the flow-passage area of the fixed orifices 10b as described above, at the time of the compression stroke, the second valve element 11 opens the holes 10a to make the orifices 12a available, and therefore, the generation of the noise at the time of the compression stroke is suppressed.

Furthermore, when the piston speed falls within the low-speed region during the compression stroke, as described above, the damping force range adjustable by the variable damping valve VV is the range from the damping force when the valve opening pressure of the variable damping valve VV is minimized to the damping force that is generated only by the fixed orifices 30b. Thus, in a case in which a damping force adjustable range during the compression stroke needs to be increased, it suffices to increase the damping force generated by reducing the flow-passage area of the fixed orifices 30b. Even if the damping force adjustable range is increased by reducing the flow-passage area of the fixed orifices 30b as described above, at the time of the extension stroke, the second valve element 31 opens the holes 30a to make the orifices 32a available, and therefore, the generation of the noise at the time of the extension stroke is suppressed.

As described above, by applying the damping valve V1 to the side of the compression-side chamber R2 in the piston unit of the shock absorber D1 and by applying the damping valve V2 to the side of the reservoir chamber R in the valve case portion, it is possible to suppress the generation of the noise while increasing the adjusting range of the damping force of the shock absorber D1.

In addition, in a case in which the damping valve V1 is applied to the side of the compression-side chamber R2 in the piston unit and a leaf valve is provided in the valve case 5 instead of the first valve element 30, the second valve element 31, the biasing member B2, and so forth of the damping valve V2, while increasing the damping force adjustable range at the time of the extension stroke of the shock absorber D1, it is possible to suppress the change in the pressure in the extension-side chamber R1 between before and after opening of the piston-side valve 6 at the time of the compression stroke, and it is possible to prevent the generation of the noise. If the noise is not generated at the time of the extension stroke of the shock absorber D1, as described above, the damping valve V1 may be applied only to the side of the compression-side chamber R2 in the piston unit.

Furthermore, in a case in which the damping valve V2 is applied to the side of the reservoir chamber R in the valve case portion and a leaf valve or a variable damping valve is provided in the piston 2 instead of the first valve element 10, the second valve element 11, the biasing member B1, and so forth of the damping valve V1, while increasing the damping force adjustable range at the time of the compression stroke of the shock absorber D1, it is possible to suppress the change in the pressure in the compression-side chamber R2 between before and after opening of the case-side valve 20 at the time of the extension stroke, and it is possible to prevent the generation of the noise. If the noise is not generated at the time of the compression stroke of the shock absorber D1, as described above, the damping valve V2 may be applied only to the side of the reservoir chamber R in the valve case portion.

In the above description, the present embodiments have been described in terms of the twin-tube shock absorbers D and D1 as the examples; however, the damping valve V1 may also be applied to the piston unit of a single-tube shock absorber. In this case, the damping valve V1 may be applied to one of or both of the extension-side chamber side and the compression-side chamber side in the piston unit.

The configurations, operations, and effects of the embodiments of the present invention will be collectively described below.

The damping valve according to this embodiment includes: the valve seat member having the port, an annular window communicated with the outlet end of the port, an inner circumference valve seat provided on an inner circumferential side of the annular window, and an outer circumference valve seat of the annular window; a first valve element formed to have an annular shape and stacked on the valve seat member, the first valve element being configured to open and close the annular window by being seated on and separated from the outer circumference valve seat, and the first valve element having a hole facing the annular window and forming a throttle or a passage in communication with a throttle; a second valve element formed to have an annular shape and provided between the inner circumference valve seat of the valve seat member and the first valve element, the second valve element being configured to open and close the hole; and a biasing member configured to bias the first valve element towards the second valve element, wherein a surface of the second valve element on an opposite side from the valve seat member is higher than the outer circumference valve seat of the valve seat member when viewed from the direction orthogonal to the axial direction of the valve seat member. With the damping valve configured as described above, the second valve element can close the hole in the no-load state by coming into close contact with the first valve element. Therefore, it is possible to reliably close the throttle even in the no-load state.

The biasing member in the damping valve may have: an annular plate having elasticity and arranged on a the opposite side of the first valve element from the valve seat member; and a ring formed to have an annular shape and provided between the first valve element and the annular plate, the ring having an inner diameter larger than inner diameters of the first valve element and the annular plate, but smaller than outer diameters of the first valve element and the annular plate. With the damping valve configured as described above, because the configuration of the biasing member is simple and a length in the axial direction is made shorter, the stroke length of the shock absorber is not compromised even if it is applied to the shock absorber, and therefore, it is also possible to avoid increase in the overall length of the shock absorber. In the above, the biasing member may be formed of the elastic body.

In addition, the damping valve may further include: the throttle valve element formed have an annular shape and stacked on the opposite side of the first valve element from the valve seat member, and the throttle valve element having the throttle in communication with the hole. With the damping valve configured as described above, it becomes easier to perform the assembly work and it is possible to exhibit the damping force by the throttle whose opening area is kept constant all the time.

Furthermore, the damping valve may include a fixed orifice. In this case, it is possible to independently set the damping force characteristics for both of the extension and compression of the shock absorber.

In addition, the shock absorber of this embodiment includes: a cylinder; the piston inserted into the cylinder in a freely movable manner, the piston being configured to partition an interior of the cylinder into the extension-side chamber and the compression-side chamber; the piston rod inserted into the cylinder and linked to the piston; the outer tube provided to cover the cylinder so as to form a reservoir chamber between the outer tube and the cylinder; the valve case provided in an end portion of the cylinder, the valve case being configured to divide the compression-side chamber and the reservoir chamber; the piston-side valve provided on the side of the extension-side chamber in the piston, the piston-side valve being configured to open and close a compression-side port provided in the piston; and the case-side valve provided on the side of the compression-side chamber in the valve case, the case-side valve being configured to open and close the suction port provided in the valve case, wherein the shock absorber further includes one of or both of the damping valve applied to the side of the compression-side chamber in the piston unit and the damping valve applied to the side of the reservoir chamber in the valve case portion.

With the shock absorber configured as described above, it is possible to reliably close the throttle even in the no-load state, to suppress the generation of the noise, and to improve the ride quality in the vehicle when it is used in the suspension of the vehicle.

Furthermore, the shock absorber includes: the cylinder; the piston inserted into the cylinder in a freely movable manner, the piston being configured to partition the interior of the cylinder into the extension-side chamber and the compression-side chamber; the piston rod inserted into the interior of the cylinder and linked to the piston; the outer tube arranged on the outer circumference of the cylinder so as to form the reservoir chamber in the interior of the outer tube; the valve case provided in an end portion of the cylinder, the valve case being configured to divide the compression-side chamber and the reservoir chamber; the piston-side valve provided on the side of the extension-side chamber in the piston, the piston-side valve being configured to open and close a compression-side port provided in the piston; the case-side valve provided on the side of the compression-side chamber in the valve case, the case-side valve being configured to open and close the suction port provided in the valve case; the damping passage configured to allow the extension-side chamber to communicate with the reservoir chamber; and the variable damping valve provided in the damping passage, the variable damping valve being configured to impart resistance to the flow of the fluid flowing from the extension-side chamber towards the reservoir chamber, wherein the shock absorber further includes one of or both of the damping valve applied to the side of the compression-side chamber in the piston unit and the damping valve applied to the side of the reservoir chamber in the valve case portion.

With the shock absorber configured as described above, it is possible to reliably close the throttle even in the no-load state, to suppress the generation of the noise while increasing the damping force adjustable range, and to improve the ride quality in the vehicle when it is used in the suspension of the vehicle.

Although the embodiment of the present invention has been described above, the above embodiment is merely an illustration of one exemplary application of the present invention and is not intended to limit the technical scope of the present invention to the specific configuration of the above embodiment.

The present application claims a priority based on Japanese Patent Application No. 2018-028777 filed with the Japan Patent Office on Feb. 21, 2018, and all the contents of this application are incorporated herein by reference.

The invention claimed is:

1. A damping valve comprising:
   a valve seat member having a port, an annular window communicated with an outlet end of the port, an inner circumference valve seat provided on an inner circumferential side of the annular window, and an outer circumference valve seat of the annular window;
   a first valve element formed to have an annular shape and stacked on the valve seat member, the first valve element being configured to open and close the annular window by being seated on and separated from the outer circumference valve seat, and the first valve element having a hole facing the annular window and forming a throttle or a passage in communication with a throttle;
   a second valve element formed to have an annular shape and provided between the inner circumference valve seat of the valve seat member and the first valve element, the second valve element being configured to open and close the hole; and
   a biasing member configured to bias the first valve element towards the second valve element, wherein
   a surface of the second valve element on an opposite side from the valve seat member is higher than the outer circumference valve seat of the valve seat member when viewed from a direction orthogonal to an axial direction of the valve seat member, and
   the first valve element is configured to be seated on the outer circumference valve seat by being subjected to a biasing force of the biasing member.

2. The damping valve according to claim 1, wherein the biasing member has:
   an annular plate having elasticity and arranged on the opposite side of the first valve element from the valve seat member; and
   a ring formed to have an annular shape and provided between the first valve element and the annular plate, the ring having an inner diameter larger than inner diameters of the first valve element and the annular plate, but smaller than outer diameters of the first valve element and the annular plate.

3. The damping valve according to claim 1, wherein the biasing member comprises an elastic body configured to bias the first valve element from the opposite side from the valve seat member.

4. The damping valve according to claim 1, further comprising
   a throttle valve element formed to have an annular shape and stacked on the opposite side of the first valve element from the valve seat member, and the throttle valve element having the throttle in communication with the hole.

5. The damping valve according to claim 1, further comprising
a fixed orifice provided in an outer circumference of the first valve element or in the outer circumference valve seat of the valve seat member.

6. A shock absorber comprising:
a cylinder;
a piston inserted into the cylinder in a freely movable manner, the piston being configured to partition an interior of the cylinder into an extension-side chamber and a compression-side chamber;
a piston rod inserted into the cylinder and linked to the piston;
an outer tube arranged on an outer circumferential side of the cylinder so as to form a reservoir chamber in an interior of the outer tube;
a valve case provided in an end portion of the cylinder, the valve case being configured to divide the compression-side chamber and the reservoir chamber;
a piston-side valve provided on a side of the extension-side chamber in the piston, the piston-side valve being configured to open and close a compression-side port provided in the piston;
a case-side valve provided on a side of the compression-side chamber in the valve case, the case-side valve being configured to open and close a suction port provided in the valve case; and
a damping valve according to claim 1, wherein
the valve seat member is the piston, and the first valve element is arranged on a side of the compression-side chamber in the piston.

7. The shock absorber according to claim 6, further comprising:
a damping passage configured to allow the extension-side chamber to communicate with the reservoir chamber; and
a variable damping valve provided in the damping passage, the variable damping valve being configured to impart resistance to a flow of fluid flowing from the extension-side chamber towards the reservoir chamber.

8. A shock absorber comprising:
a cylinder;
a piston inserted into the cylinder in a freely movable manner, the piston being configured to partition an interior of the cylinder into an extension-side chamber and a compression-side chamber;
a piston rod inserted into the cylinder and linked to the piston;
an outer tube arranged on an outer circumferential side of the cylinder so as to form a reservoir chamber in an interior of the outer tube;
a valve case provided in an end portion of the cylinder, the valve case being configured to divide the compression-side chamber and the reservoir chamber;
a piston-side valve provided on a side of the extension-side chamber in the piston, the piston-side valve being configured to open and close a compression-side port provided in the piston;
a case-side valve provided on a side of the compression-side chamber in the valve case, the case-side valve being configured to open and close a suction port provided in the valve case; and
a damping valve according to claim 1, wherein
the valve seat member is the valve case, and the first valve element is arranged on a side of the reservoir chamber in the valve case.

9. The shock absorber according to claim 8, further comprising:
a damping passage configured to allow the extension-side chamber to communicate with the reservoir chamber; and
a variable damping valve provided in the damping passage, the variable damping valve being configured to impart resistance to a flow of fluid flowing from the extension-side chamber towards the reservoir chamber.

10. A shock absorber comprising:
a cylinder;
a piston inserted into the cylinder in a freely movable manner, the piston being configured to partition an interior of the cylinder into an extension-side chamber and a compression-side chamber;
a piston rod inserted into the cylinder and linked to the piston;
an outer tube arranged on an outer circumferential side of the cylinder so as to form a reservoir chamber in an interior of the outer tube;
a valve case provided in an end portion of the cylinder, the valve case being configured to divide the compression-side chamber and the reservoir chamber;
a piston-side valve provided on a side of the extension-side chamber in the piston, the piston-side valve being configured to open and close a compression-side port provided in the piston;
a case-side valve provided on a side of the compression-side chamber in the valve case, the case-side valve being configured to open and close a suction port provided in the valve case; and
a damping valve according to claim 1, wherein
the valve seat member is the piston, the first valve element is arranged on a side of the compression-side chamber in the piston, the valve seat member is the valve case, the first valve element is arranged on a side of the reservoir chamber in the valve case.

11. The shock absorber according to claim 10, further comprising:
a damping passage configured to allow the extension-side chamber to communicate with the reservoir chamber; and
a variable damping valve provided in the damping passage, the variable damping valve being configured to impart resistance to a flow of fluid flowing from the extension-side chamber towards the reservoir chamber.

12. The damping valve according to claim 1, wherein the biasing member is configured to cause the first valve element to be seated on the outer circumference valve seat by deforming the second valve element together with the first valve element towards the valve seat member.

* * * * *